(12) United States Patent
Zhang et al.

(10) Patent No.: US 6,611,624 B1
(45) Date of Patent: *Aug. 26, 2003

(54) SYSTEM AND METHOD FOR FRAME ACCURATE SPLICING OF COMPRESSED BITSTREAMS

(75) Inventors: Ji Zhang, San Jose, CA (US); Yi Tong Tse, San Jose, CA (US)

(73) Assignee: Cisco Systems, Inc., San Jose, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 09/173,708

(22) Filed: Oct. 15, 1998

Related U.S. Application Data

(60) Provisional application No. 60/077,999, filed on Mar. 13, 1998.

(51) Int. Cl.[7] .............................. G06K 9/36; H04N 7/12; H04J 3/00

(52) U.S. Cl. ................... 382/232; 375/240.26; 370/498

(58) Field of Search .............................. 382/232, 236, 382/234; 348/705, 512; 375/240.26, 240.25, 240.05, 240.15; 370/498, 487

(56) References Cited

U.S. PATENT DOCUMENTS

| | | | | |
|---|---|---|---|---|
| 5,185,819 A | * | 2/1993 | Ng et al. .................... | 382/234 |
| 5,805,220 A | * | 9/1998 | Keesman et al. ...... | 375/240.01 |
| 5,907,374 A | * | 5/1999 | Liu ........................ | 375/260.24 |
| 5,912,709 A | * | 6/1999 | Takahashi .............. | 375/240.15 |
| 5,982,436 A | * | 11/1999 | Balakrishnan et al. . | 375/240.05 |
| 6,038,000 A | * | 3/2000 | Hurst, Jr. ............... | 375/240.26 |
| 6,101,195 A | * | 8/2000 | Lyons et al. ................ | 370/498 |
| 6,269,081 B1 | * | 7/2001 | Chow et al. ................ | 370/241 |

FOREIGN PATENT DOCUMENTS

| | | | |
|---|---|---|---|
| EP | 0739138 A2 | * 10/1996 | ............ H04N/7/26 |

OTHER PUBLICATIONS

"MPEG Splicing and Bandwidth Management," Birch, International Broadcasting Convention, Sep. 12–16, 1997, pp. 541–546.*

* cited by examiner

Primary Examiner—Wenpeng Chen
(74) Attorney, Agent, or Firm—Beyer Weaver & Thomas LLP

(57) ABSTRACT

A system for performing frame accurate bitstream splicing includes a first pre-buffer, a second pre-buffer, a seamless splicer, and a post-buffer. The system also includes a time stamp extractor, a time stamp adjuster, and a time stamp replacer for timing correction. The first and second pre-buffers are input buffers to the seamless splicer, and the post-buffer is coupled to the output of the seamless splicer. The seamless splicer receives the two streams via the first and second pre-buffers and produces a single spliced bitstream at its output in response to the cue tone signal. The seamless splicer provides the first bitstream, then re-encodes portions of the first and second bit streams proximate the splicing points (both the exit point and the entry point), and then switches to providing a second bitstream. The seamless splicer also performs rate conversion on the second stream as necessary to ensure decoder buffer compliance for the spliced bitstream. The present invention also includes a method for performing bitstream splicing comprising the steps of: determining a splicing point switching between a first bitstream and a second bitstream, determining whether the second bitstream has the same bit rate as the first bitstream, converting the rate of the second bitstream if it is not the same as the bit rate of the first bitstream, and re-encoding picture proximate the splicing point.

46 Claims, 21 Drawing Sheets

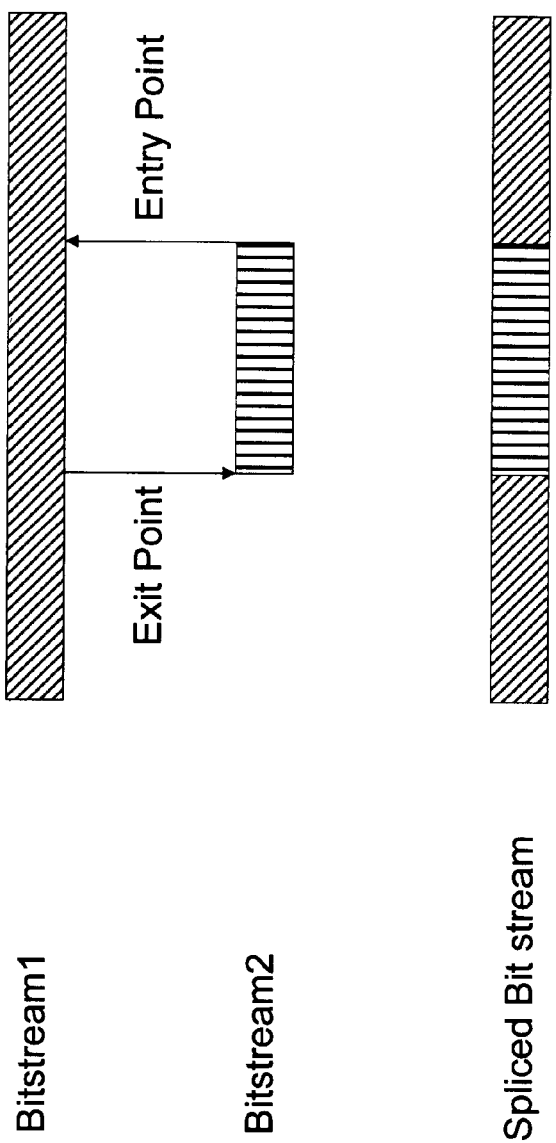

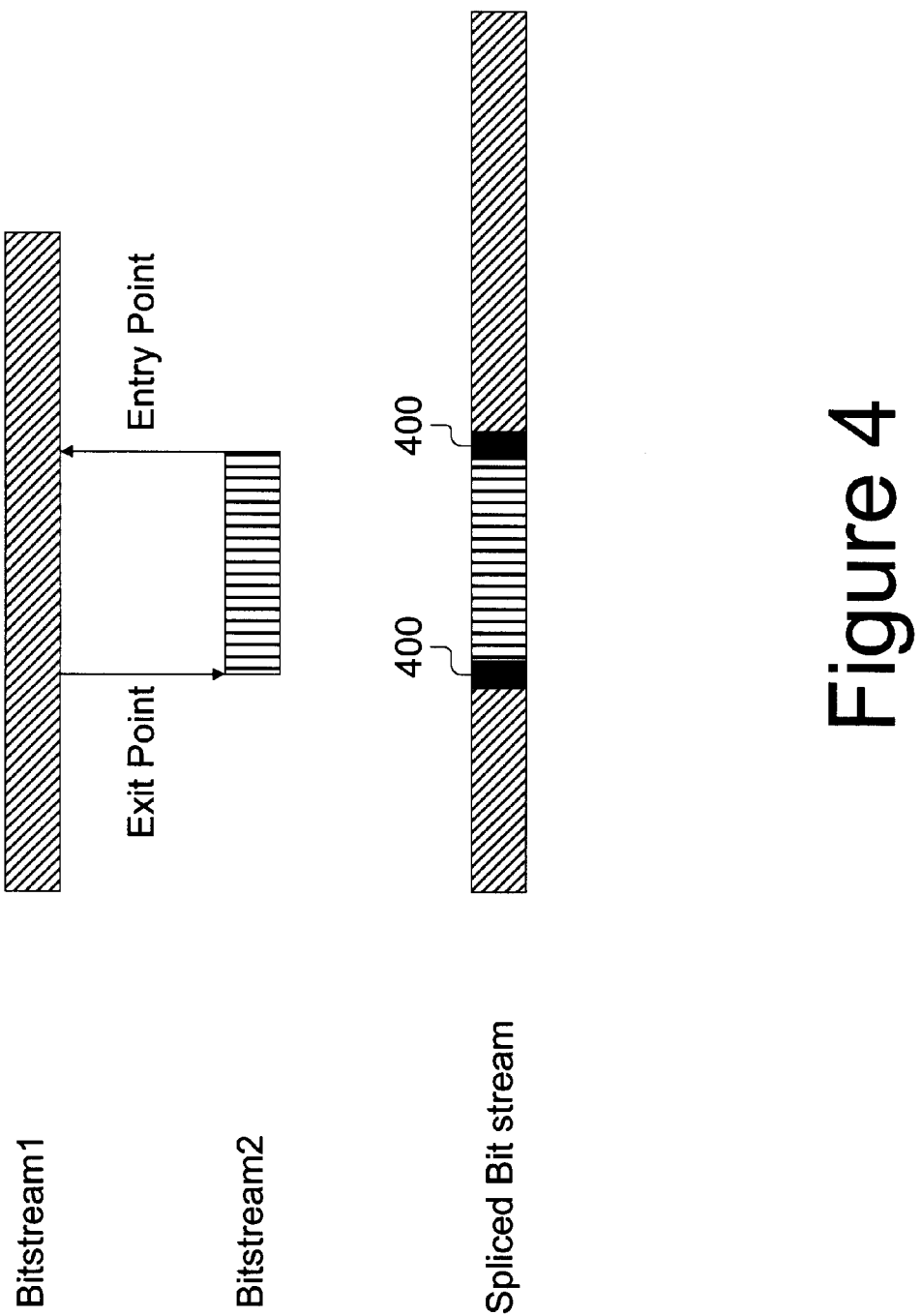

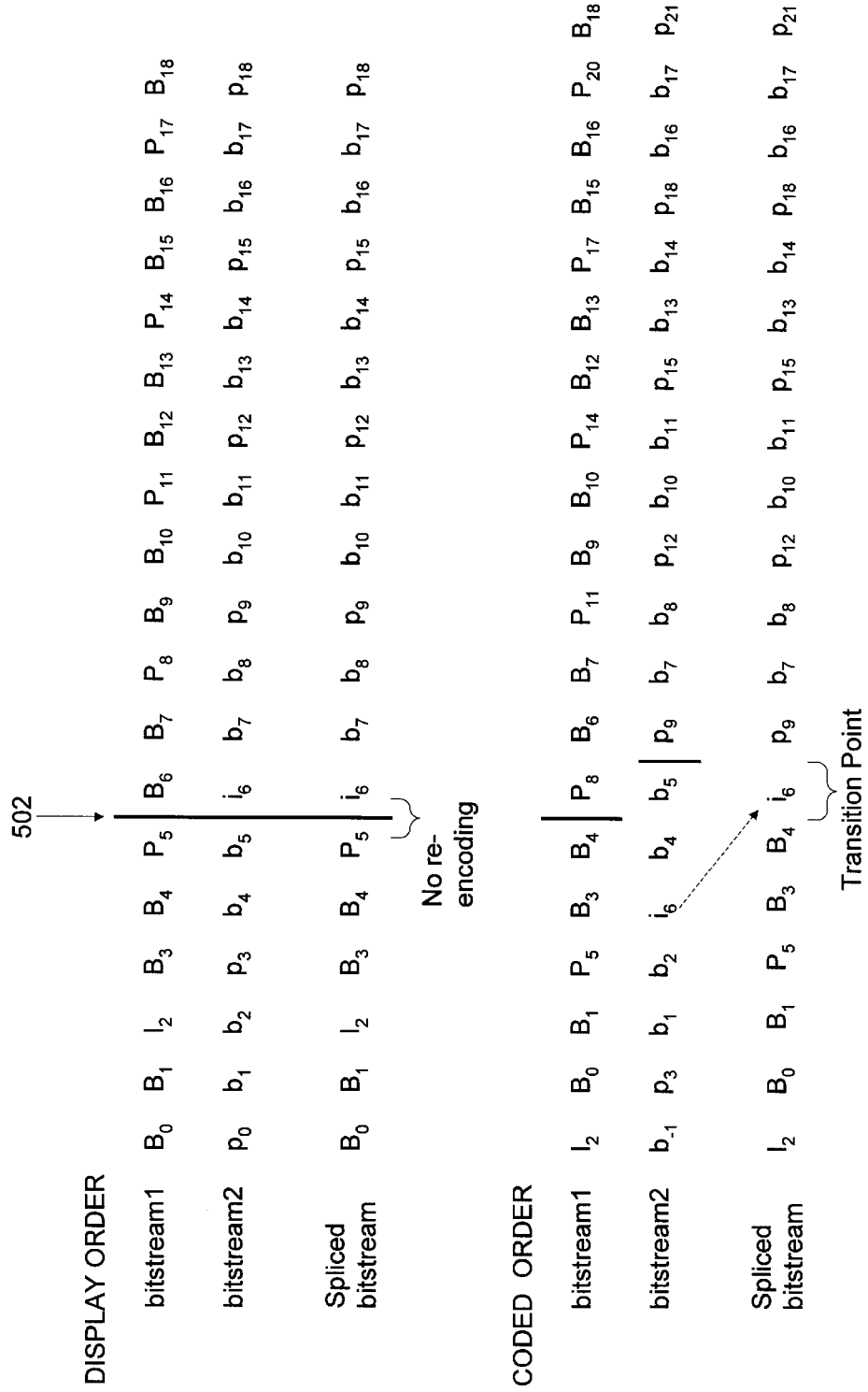

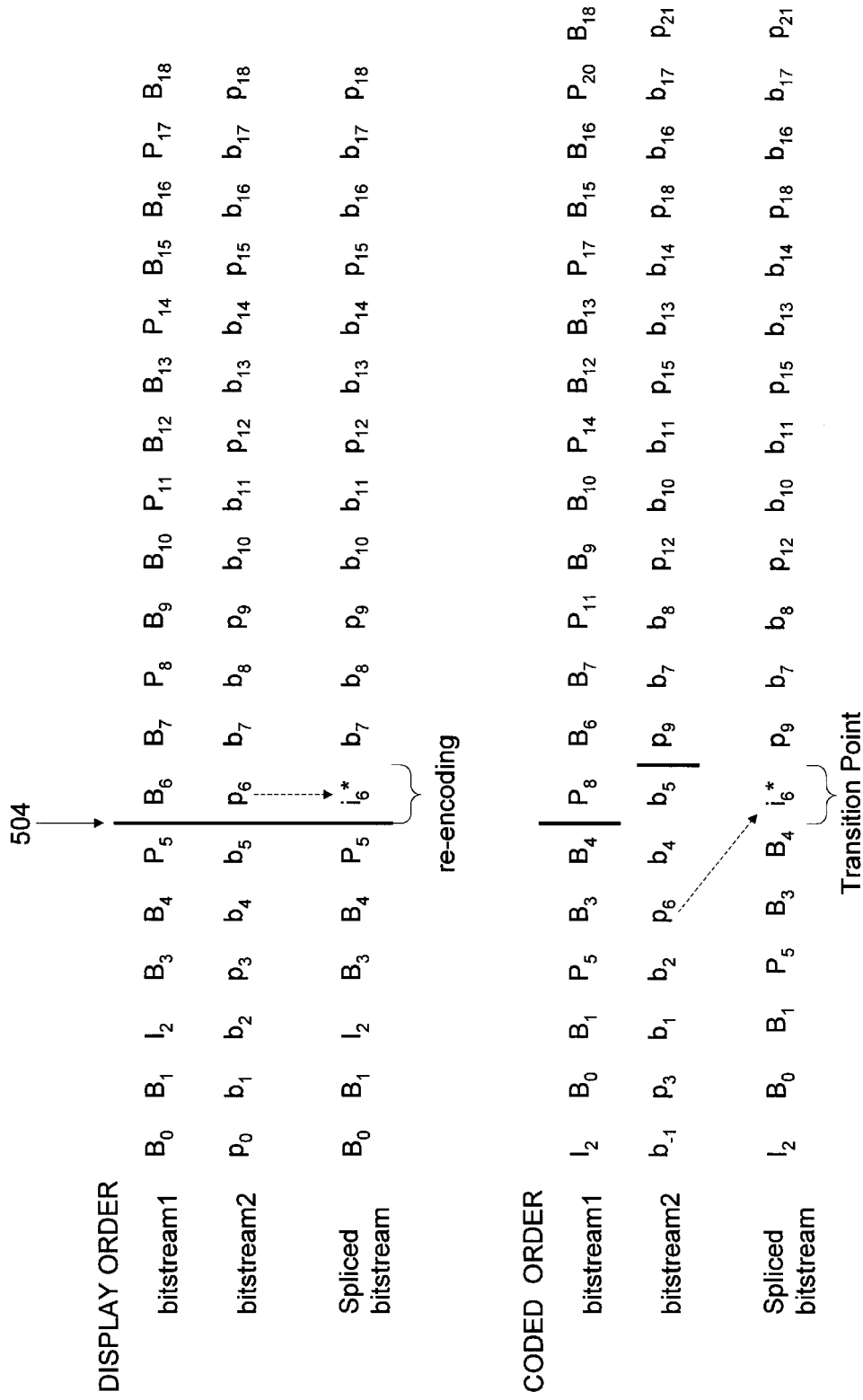

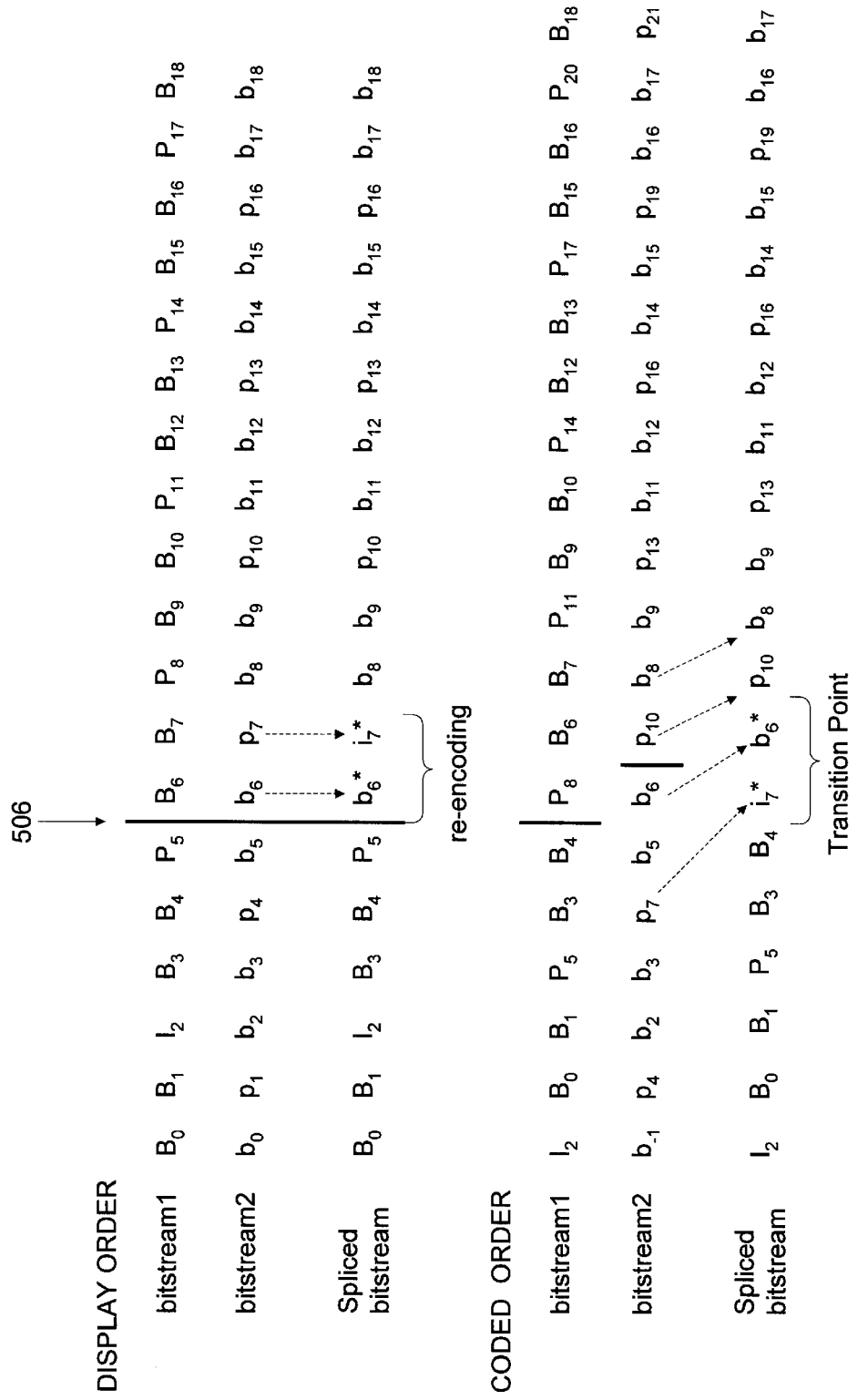

SYSTEM AND METHOD FOR FRAME ACCURATE SPLICING OF COMPRESSED BITSTREAMS

This application claims the benefit of provisional application No. 60/077,999, filed Mar. 13, 1998, now abandoned.

BACKGROUND OF THE INVENTION

1. Field of the Invention

The present invention relates generally to systems and methods for splicing two compressed bitstreams together to form a single compressed bit stream. In particular, the present invention relates to a system and a method for video bitstream splicing that is frame accurate. Still more particularly, the present invention relates to a system and method for seamless splicing of MPEG-2 video bitstreams.

2. Description of the Related Art

Digital video compression is a process that removes redundancy in the digital video pictures such that the resulting representation of the signal contains much smaller number of bits than that in the original uncompressed pictures. The redundancy in the digital video sequences, consist of a sequence of digital pictures played out in a time continuous manner, is reflected in the form of spatial redundancy in a picture and temporal redundancy between pictures. MPEG-2 compression takes advantage of these redundancies by efficient coding of the spatial digital image content and temporal motion content. Algorithms for MPEG-2 video compression are well known in the art.

Digital stream insertion (also called digital program insertion (DPI), digital spot insertion, etc.) is a process that replaces part of a digital compressed bitstream by another compressed bitstream, which may have been encoded off-line in a different location or at a different time. This process is illustrated via FIG. 1. In the figure, part of bitstream 1 is replaced by bitstream 2. In real applications, bitstream 1 may be a real-time feed from the distribution network, and bitstream 2 may be a section of advertisement that is to be inserted into the network feed. As a result of the insertion, the resulting bitstream has the advertisement inserted into the network bitstream feed. Since this is the main application of DPI, we may refer in this application to bitstream 1 as the live stream, and bitstream 2 the stored stream.

The underlying technique for DPI is bitstream splicing (also known as bitstream concatenation), where a transition is made from an old stream to a new stream. The transition is called splice point. The splicing process in its most general form could be between a first and a second stream that are continuously playing and the transition is from the middle of the first stream to the middle of the second stream. However, in the context of DPI, two special cases are of interest. Each insertion involves two splice points: an exit point and an entry point. Here, we define the exit point as the transition from the middle of the first (live) stream to the beginning of a second (stored) stream. We define the entry point as the transition from the end of the second (stored) stream to the middle of the first (live) stream. Both of these points are splice points, and are illustrated in FIG. 1.

One prior art method for performing splicing is the use of analog splicing equipment. In this case, the two signals to be switched are time continuous pictures. The splicing equipment, at the time of splicing, turns off one signal at the picture frame boundary and turns on the other signal, resulting in a scene change to the viewer. The two signals are assumed to be frame synchronized, the time for the splicing is well defined. However, to splice two digitally compressed bitstreams, the situation is much more complex. This is due to the nature of the motion compensation and variable length encoding of digital video pictures. Specifically, compressed or encoded digital pictures do not necessarily have the same number of bits; in addition, the digital picture content is reconstructed not from a single encoded digital picture, but from several of them via motion compensation. More specifically and as show in FIGS. 2A and 2B, the bitstreams are compose of a number of frames or pictures. The MPEG standard defined three types of pictures: intra, predicted and bi-directional. Intra pictures or I-pictures are coded using only information present in the picture itself. Predicted pictures or P-pictures are coded with respect to the nearest previous I- or P-picture as show in FIG. 2A. Bi-directional pictures or B-pictures are coded with reference to the two most recent sent I/P-pictures as illustrated by FIG. 2B.

The basic requirement for any digital bitstream splicing system or method is that the splicing must not introduce any visible artifacts into the decoded video of the resulting bitstream. There have been some prior art method for digital bitstream splicing, however, they are not able to provide frame accurate splicing. These prior art method resort to imposing several constraints to the formats of the streams being spliced, thus not providing seamless and frame-precise splicing. For example, some prior art methods allow splicing only immediately before an I-frame. This is problematic because there could be as many as 30 frames between I-frames. Other methods require that the bit rates of the spliced streams be the same and constant. Yet other prior art methods require that the stored stream start with an I-picture and/or the live stream start with an I-picture right after the stored stream has ended. Thus, such prior art methods do not provide for seamless and frame-precise splicing where splicing is allowed to happen at any picture location (this is what frame-precise or accurate splicing means).

A particular problem with the slicing methods of the prior art is that they require both streams to have the same constant bit rate. Splicing of bitstreams may occur in either constant bit rate (CBR) environment or variable bit rate (VBR) environment. In the CBR environment, the live stream has a bit rate, $R_1$, that is constant throughout the transmission. In order to splice the stored stream with bit rate, $R_2$, the two bit rates must be identical, $R_1=R_2$. For example, assuming the channel transmits at rate $R_1$ before and after splicing, if $R_1>R_2$, then the decoder buffer will overflow, shortly after the exit point, causing corruption in the decoded pictures, and if $R_1<R_2$, the decoder buffer will under flow, shortly after the entry point, which causes the decoder to freeze displayed pictures. This rate mismatch can be solved by either stuffing of the stored stream if $R_1>R_2$, or by rate reduction if $R_1<R_2$. Thus, the prior art has not provided a splicing system and method able to handle streams with different rates in real time.

Another more generalized look at the same problem described above is the buffer compliance problem (i.e., the problem of matching coded picture bit usage to that of the data delivery rate of the transmission channel). This problem is what is called the rate control problem. The MPEG-2 encoding process must be under a rate control algorithm. Specifically, the encoder rate control must ensure that the decoder buffer cannot under flow or overflow. If no splicing is performed in the bitstream, this responsibility is taken entirely by the encoder. However, when splicing is performed, two bitstreams are involved, each is possibly encoded at a different time by a different encoder. In this case, the decoder's buffer trajectory just before splicing is defined by the rate control algorithm running on the live stream encoder. Starting from the splicing point, the new stream encoding rate control takes over, and this is where the buffer compliance of the decoder may be violated. To see this, consider the following example shown in FIG. 3. The figure describes the decoder buffer behavior during the splicing. In the example shown, assuming two CBR bitstreams are spliced together without change, and assuming that the first picture of the new stream replaces the B picture right after the last I1-picture in the old stream is removed from the decoder buffer. Since the first stream encoder knows that the next picture in the first stream is a B2-picture, it will thus assume that the decoder buffer will not under flow given that B2 has fewer bits. However, unknown to the second stream encoder, this is where splicing occurs. The next picture to be removed from the decoder buffer is actually the I2-picture from the new stream, which has many more bits than the B2-picture in the first stream. This will causes the decoder buffer to under flow as shown in the FIG. 3. Thus, there is a need for a digital frame splicer that eliminates the under flow or overflow of the decoder buffer. Again, the problem described above is not limited to CBR to CBR splicing, but exist also in more general variable rate bitstream splicing.

A further problem in splicing two digitally encoded streams is resolving timing differences between the two streams. The splicing process causes two different MPEG-2 bitstreams, each encoded in a different location or at a different time, to be joined into a single bitstream. Therefore, the first and the second streams may contain independent timing information, which was generated by its respective encoder. The splicing process may cause a discontinuity in the time base. The spliced stream must be decoded in real-time by the decoder. The decoder maintains a local clock which runs phase locked to the time base embedded in the input bitstream. Therefore, the discontinuity of the time base due to splicing may cause the decoder to temporarily lose synchronization. The prior art has attempted to solve this problem by inserting a PCR carrying packet as the first packet of the new stream and at the same time setting the discontinuity indicator in the adaptation field to 1. An MPEG-2 compliant decoder receives this indicator and takes proper action to ensure the time base discontinuity is handled correctly. This requirement on the PCR packet placement, however adds additional complexity and hardware, and is not a complete solution because some decoders do not recognize the indicator. Thus, there is a need for splicing two digital bitstreams without the above timing problems.

A final problem in splicing two digitally encoded streams is the dependence of frames before the splicing point on frames after the splicing point. Due to the inter-frame coding, a decoded picture requires the use of several coded pictures. For example, if a particular picture is coded as B picture, several other neighboring coded pictures must also be used to first obtain reference pictures, then the coded pictures. This presents a particular problem because after splicing those frames will not be part of the bitstream. If a B picture is the last picture to be displayed before the new stream is inserted, the decoder will use the next anchor picture in the new stream as the reference picture to decode the B picture, which will cause artifacts in the decoded pictures. Similar problem exists upon completion of the splicing. When the stored stream is completed, the splicer needs to switch back to the first or live stream. If the first picture after the switch back is not an intra picture, the decoded picture may not be correct. The prior art has attempted to solve this problem by requiring that the real-time encoder of the live stream forces anchor pictures at exit and entry points, closed GOP restriction, insertion of splice point syntaxes into the live stream. However, these restrictions limit the flexibility of the splicing process and are generally difficult to implement. Another alternative is to use real-time decoder followed by encoder to perform real-time re-encoding which can re-encode and insert anchor pictures at splicing points. The difficulty with this approach is that such real-time decoders and encoders are very expensive in terms of cost, computation, area of silicon and a variety of other factors.

Therefore, there is a need for a new system and a new method for performing seamless splicing of bitstreams at a frame accurate level.

SUMMARY OF THE INVENTION

The present invention overcomes the deficiencies and limitations of the prior art with a system and a method for seamless, frame-accurate bitstream splicing. The present invention provides arbitrary splicing of bitstreams in real-time. The system for performing frame accurate bitstream splicing comprises a first pre-buffer, a second pre-buffer, a seamless splicer, and a post-buffer. The system also includes a time stamp extractor, a time stamp adjuster and a time stamp replacer to adjust the time base to match the spliced stream output by the seamless splicer. The first pre-buffer is coupled to receive a first bitstream, and the second pre-buffer is coupled to receive a second bitstream. The output of each of the first and second pre-buffers is coupled to a respective input of the seamless splicer. The seamless splicer receives the two streams via the first and second pre-buffers and produces a single spliced bitstream at its output in response to the cue tone signal. The seamless splicer provides the first bitstream, and then re-encodes portions of the first and second bit streams proximate the splicing points (both the exit point and the entry point). The seamless splicer also performs rate conversion on the second stream as necessary so that the spliced stream has decoder buffer compliance. It should be understood that throughout this patent application the terms "re-coding" and "rate conversion" have been used interchangably. The output of the seamless splicer is coupled by the post-buffer to the time stamp replacer. The use of the first and second pre-buffers and the post-buffer is particularly advantageous because it allows effective real-time re-encoding to be performed without the need for the complex and expensive hardware required for real time encoders and decoders.

The present invention also includes a method for performing bitstream splicing comprising the steps of: determining a splicing point switching between a first bitstream and a second bitstream, determining whether the second bitstream has the same bit rate as the available transmission bandwidth, converting the rate of the second bitstream if it is not the same as the bit rate of the transmission bandwidth, regardless of whether it is CBR or VBR, and re-encoding picture proximate the splicing point.

The system and method of the present invention is particularly advantageous because it imposes minimal constraints on the bitstream to be spliced, and can be used to perform unrestricted frame-precise splicing regardless of the original coded picture type. Furthermore, it can perform the unrestricted frame-precise splicing in real-time. In particular, the present invention provides a unique and novel rate matching of the two input bitstreams. The present invention also ensures the buffer compliance for the decoder with rate control. Finally, the present invention also corrects the differences between the two time bases of the streams being spliced through the use of a time stamp adjuster that corrects the PCR and PTS/DTS of the new spliced stream.

BRIEF DESCRIPTION OF THE DRAWINGS

FIG. 1 is a diagram illustrating the splicing of two bit streams into a single bit stream.

FIG. 4 is graphical representation of a first bitstream, a second bitstream and a spliced bitstream constructed according to the present invention.

FIGS. 5A–5F are diagrams illustrating exemplary formats for the video data streams in terms of I, P and B frames, and the portions re-encoded according to the present invention.

DETAILED DESCRIPTION OF THE PREFERRED EMBODIMENTS

Figure 2B:
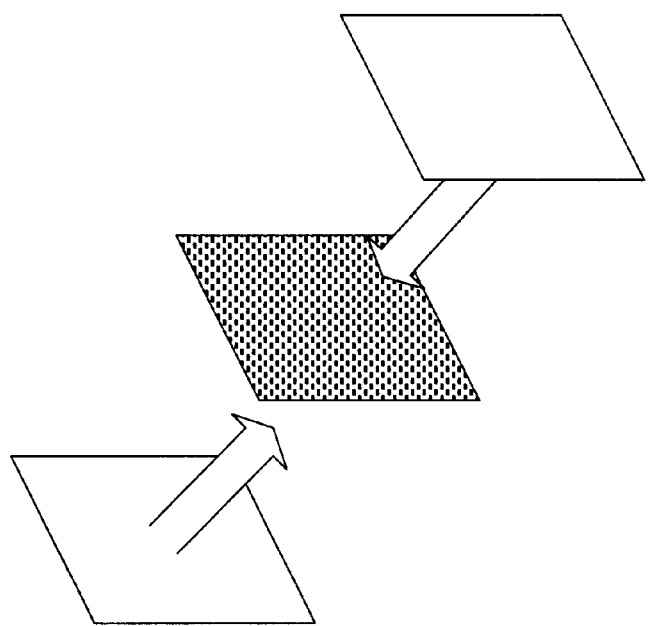
FIG. 2B is a diagram illustrating the relationship of a bi-directional picture (B-frame) and its use of both the previous and following frames that are used as coding references.
Figure 2A:
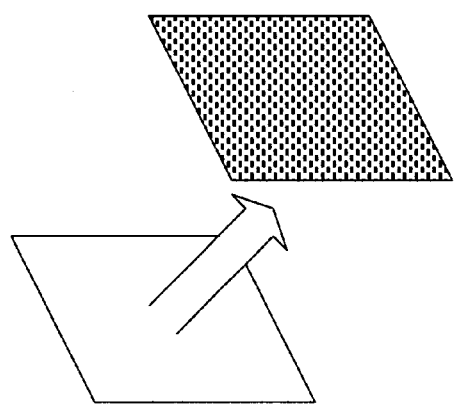
FIG. 2A is a diagram illustrating the relationship of a predicted picture (P-frame) to the previous frame that it uses as a coding reference.
Figure 3:
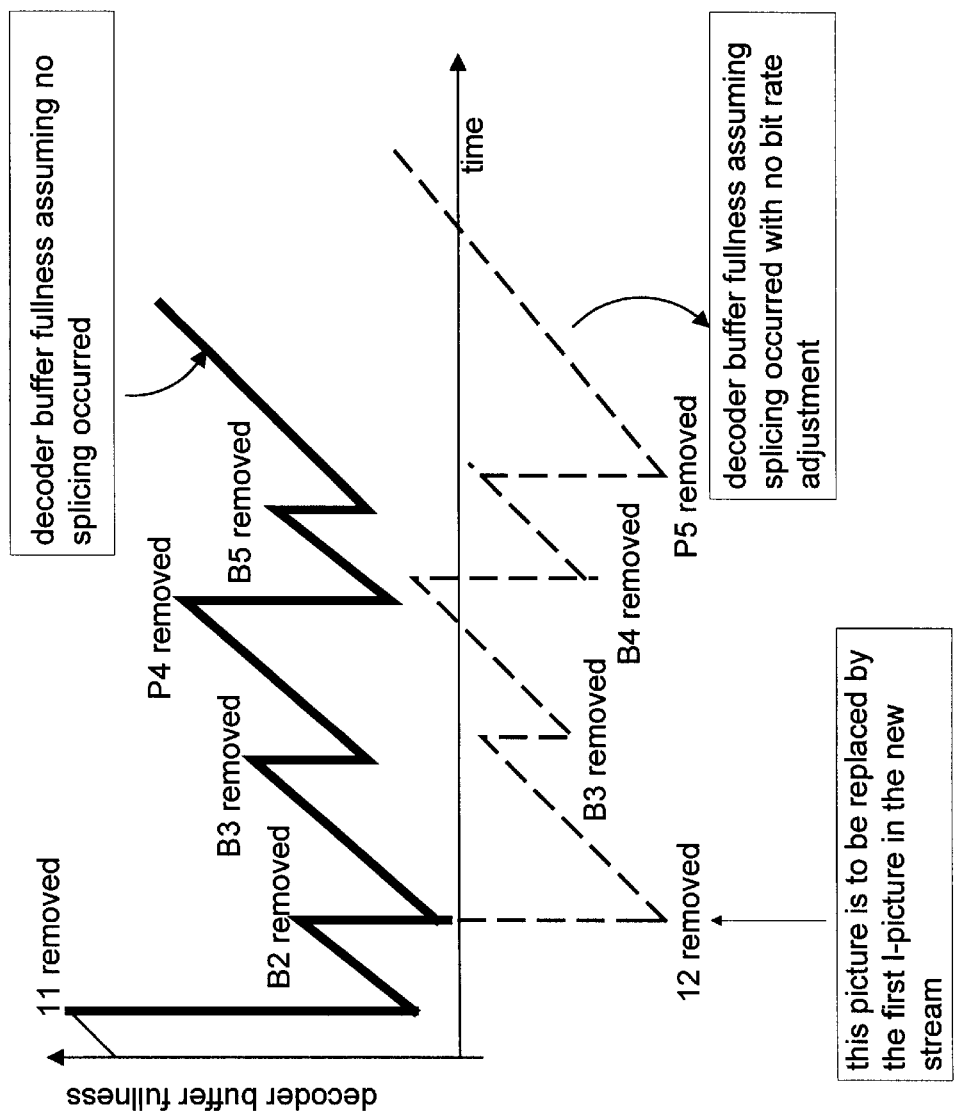
FIG. 3 is graph showing the buffer under flow and overflow problems in the prior art caused by splicing two streams together.

While the present invention will now be described with particularity for the handling of MPEG-2 digital video compression, those skilled in the art will recognize that the principles of the present invention may be applied to a variety of other related video compression schemes such as the H.26X video conference signals. Specifically, we describe a technique, called splicing, that can be used to perform digital stream insertion. The technique described here can be applied to other motion compensation based digital video compression systems, such as H.26X video conferencing systems. Furthermore, those skilled in the art will recognize that the bit streams discussed below are unscrambled. This allows direct access to all the bitstream content for rate reduction, re-coding, and timing re-stamping. In cases where the bitstreams are scrambled, they first need to be unscrambled, spliced and then re-scrambled.

Referring now to FIGS. 4 and 5A–5E, an overview of the present invention will be provided. FIG. 4 illustrates a first bitstream, a second bitstream and a spliced bitstream that is constructed according to the present invention. In particular, FIG. 4 highlights the use of reordering and/or re-encoding by the present invention for a few frames or pictures near the splice points, the exit point and the entry point. In particular, blocks 400 show the re-encoded areas of the resulting spliced bitstream. In accordance with the present invention, the frames in the re-encoded areas are selectively re-encoded depending on which frames in the first and second bitstreams are affected by the splice point.

As best shown in FIGS. 5A–5E, the number of frames that are re-encoded depends on the position of the splice point in the first and second bitstreams. FIGS. 5A–5E are diagrams illustrating exemplary video data streams in terms of I, P and B pictures, and the portions of the streams re-encoded according to the present invention. Those skilled in the art will recognize that the first, second and spliced bitstreams are all shown in both display order and coded or transmission order for ease of understanding. Beyond the definitions of I, B & P pictures provided above, the present invention also uses the term "anchor frame" to indicate either an I-picture or a P-picture, but not a B-picture. Furthermore, while the present invention will be described in FIGS. 5A–5E as an exit point, those skilled in the art will understand that each of the examples could be an entry point if the first bitstream is the stored stream and the second bitstream is the live stream. The number of pictures that the present invention re-orders and/or re-encodes can be none, a portion of the first bitstream, a portion of the second bitstream or portions of both the first and second bit streams.

As shown in FIG. 5A, no re-encoding, only re-ordering, is necessary when the splice point 502 is after an anchor frame in the first bitstream and before an I-picture in the second bitstream (both bitstreams in display order). In such a case, the present invention switches from outputting the pictures of the first bitstream to outputting the pictures of the second bitstream at the splice point, entry point 502. However, as shown in the coded order equivalent there is a transition point after the splice point 502, where the first anchor frame of the second bitstream after the spice point, $i_6$ is re-ordered. FIG. 5B illustrates a similar case where the splice point 504 is after an anchor frame in the first bitstream, but before a P-picture, $p_6$, in the second bitstream, shown in display order. In this case, the P-picture, $p_6$, is preferably re-encoded to an I-picture, $i_6^*$, since the previous P-picture, $p_3$, in the second bitstream will not be part of the spliced bitstream and not available for reference. Otherwise the first and second bitstreams remain unchanged. The spliced bitstream then becomes the first bitstream until the splice point 504, the re-encoded I-picture, $i_6^*$, and the second bitstream from to picture after the re-encoded P-picture, $p_6$. Those skilled in the art will recognize that an alternate embodiment of the present invention could instead re-order and replace picture, $p_6$, with a re-encoded picture, $p_6^*$, that references $P_5$ in place of picture $i_6^*$.

Figure 5D:
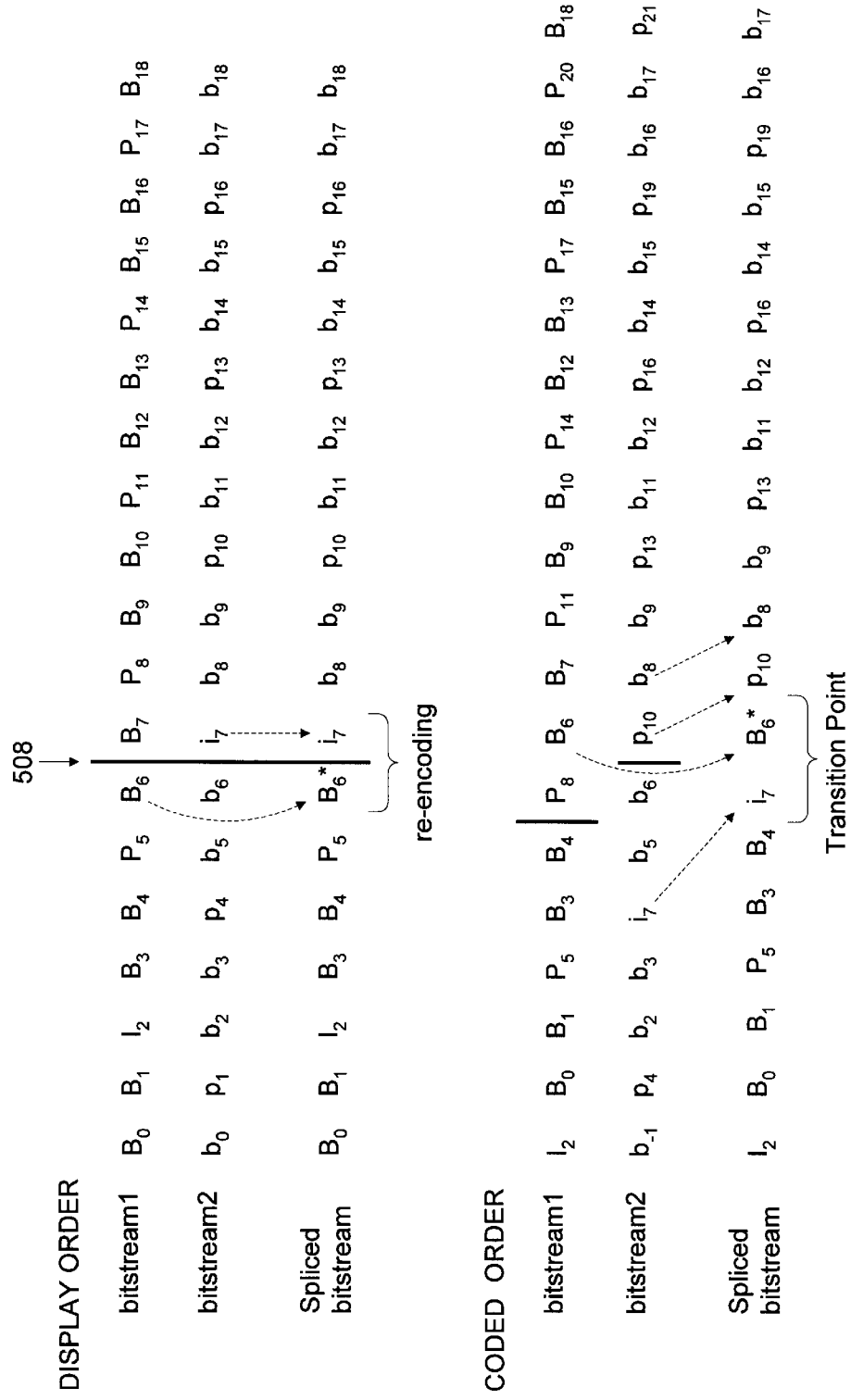

FIG. 5C illustrates the case where the splice point 506 is after an anchor frame in the first bitstream, but before a B picture in the second bitstream, both in display order. In this case, a re-encoded I-picture, $i_7^*$, based on the old P-picture, $p_7$, of the second bitstream replaces the P-picture, $p_7$, and the B-pictures, if any, of the second bitstream from the splice point 506 up to the next anchor picture in the second stream are re-encoded using the new I-picture, $i_7^*$ as a reference. Thus, for the particular case shown in FIG. 5C, the new I-picture, $i_7^*$, replaces $p_7$ and the B picture, $b_6^*$, is re-encoded based on the new I-picture. Otherwise, the spliced bitstream is the first bitstream before the splice point 506 and the second bitstream after the splice point 506 (e.g., from $p_{10}$ on). While the present invention is shown in FIGS. 5A–5F as avoiding cross picture encoding (coding from B to an anchor picture, I or P, or vice versa), it should be understood that the present invention applies equally to when cross picture encoding is performed, however, cross picture encoding requires picture order swapping, thus leads to larger buffer requirements. Also, since B-pictures have lower quality and cross picture coding would produce anchor frames of lower quality. It should also be noted that present invention could do the encoding using the two bitstreams, but does not. For example, the re-encoded B picture, $b_6^*$, is preferably re-encoding using only reference to re-encoded I-picture, $i_7^*$, and without reference to picture $P_5$. Those skilled in the art will recognize that in an alternate embodiment of the present invention, $b_6$ and $p_7$ could be replaced by re-encoded $b_6^*$ and $b_7^*$, respectively, both referencing $P_5$ and $p_{10}$.

Figure 5E:
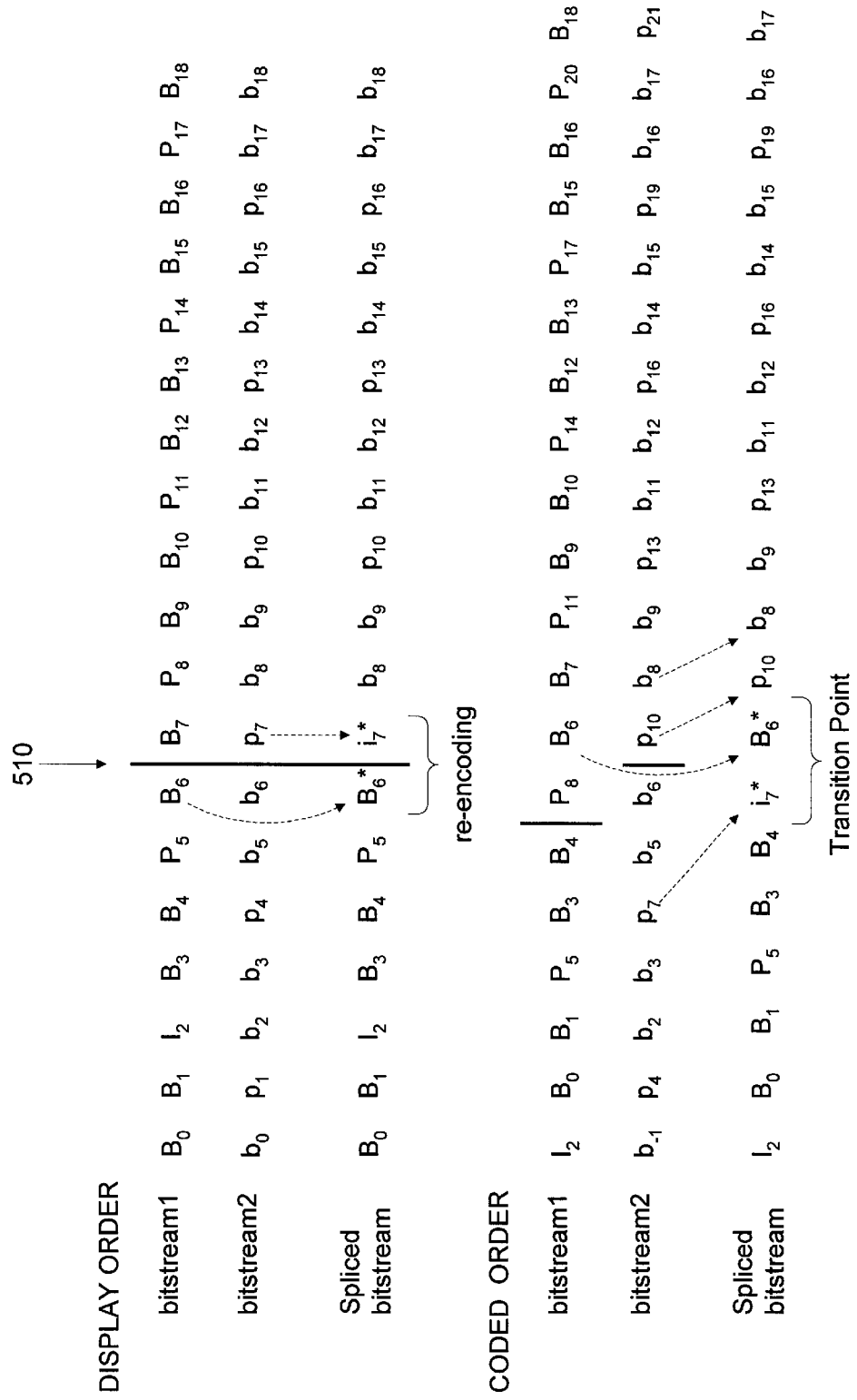

FIG. 5D illustrates the case where the splice point 508 is after a B picture in the first bitstream and before an I-picture in the second bitstream, both in display order. In this case, no encoding of the second bitstream is needed and only a portion of the first bitstream is re-encoded. However, the order of the frames is adjusted to put the I-picture from the second bitstream before the re-encoded B-pictures of the first bitstream that are after the last anchor frame and before the splice point 508. For the particular case shown in FIG. 5D, this means that I-picture, $i_7$, is moved before picture $B_6$, and picture $B_6$ is re-encoded to $B_6^*$. The first bitstream prior to the splice point 508, and the second bitstream after the splice point otherwise form the spliced bitstream. It should be noted that re-encoded picture, $B_6^*$, is preferably re-encoded only with reference to picture $p_6$ and without reference to picture $i_7$. FIG. 5E illustrates a similar case to FIG. 5D except that the splice point 510 in display order is followed by a P-picture as opposed to an I-picture. In this case the P-picture after the splice point 508 is re-encoded as an I-picture, $i_7^*$, and re-ordered for coding order. Again, those skilled in the art will recognize that in an alternate embodiment of the present invention, $p_7$ could be replaced by re-encoded $b_7^*$ that references $P_5$ and $p_{10}$. Again, re-encoded picture, $B_6^*$, is preferably re-encoded only with reference to picture $P_6$ and without reference to picture $i_7^*$ to avoid having to re-encode from both bitstreams which would require additional hardware and introduce additional error since the content in the two streams will typically be unrelated.

Figure 5F:
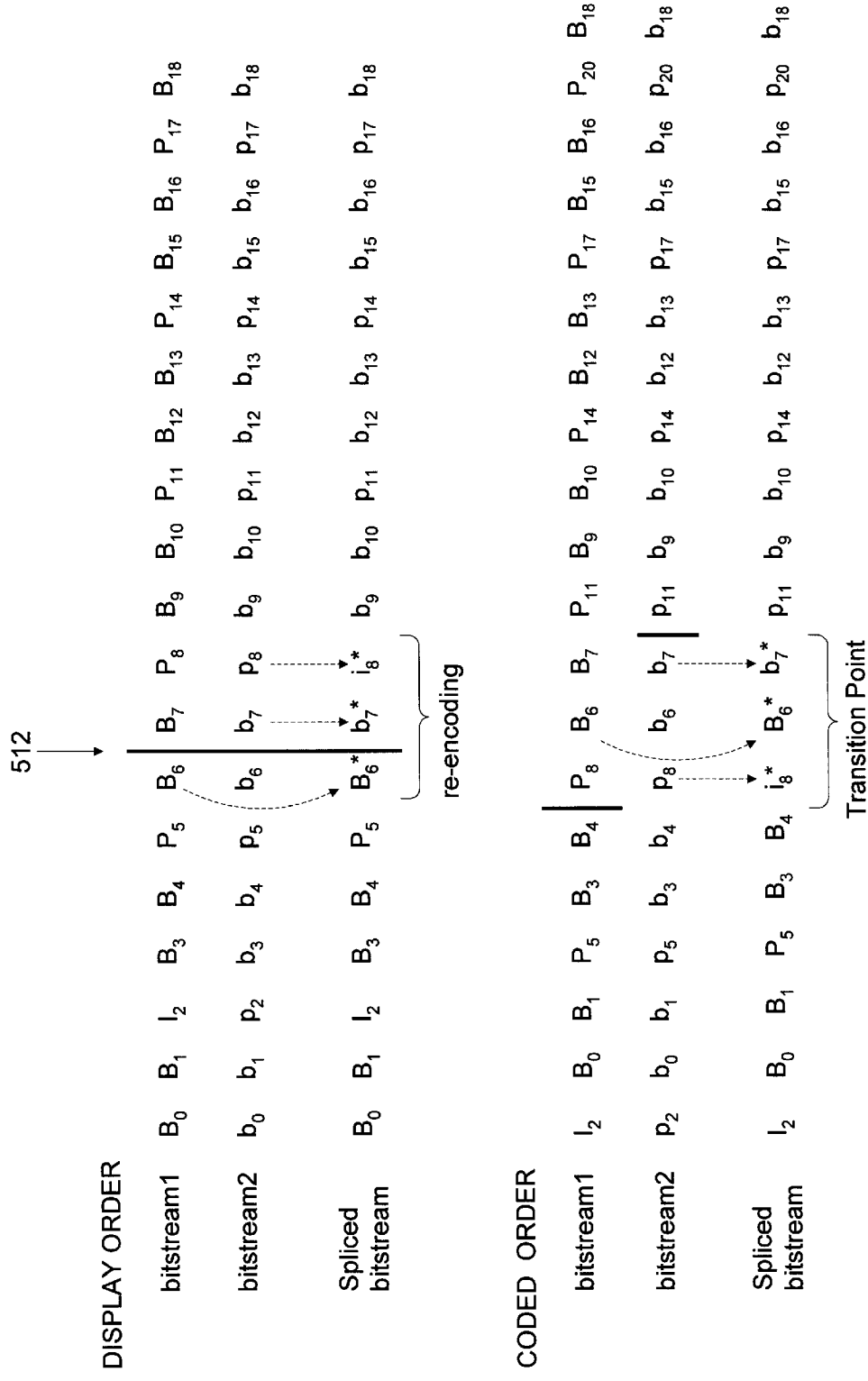

FIG. 5F illustrates the final case where the splice point 512 is after a B picture in the first bitstream and before a B picture in the second bitstream, both in display order. In this case, frames of both the first and second bitstreams proximate the splice point 512 must be re-encoded. With particular reference to the bitstreams shown in FIG. 5F, the B-pictures $B_6$ and $b_7$ are re-encoded to be $B_6^*$ and $b_7^*$, respectively, with reference to $P_5$ and $i_8^*$ alone respectively, and the P-picture $p_8$ is re-encoded as $i_8^*$. Those skilled in the art will notice that the P-picture $p_8$ could also be re-encoded as $p_8^*$ referencing $P_5$ as opposed to being a new I-picture.

Figure 6:
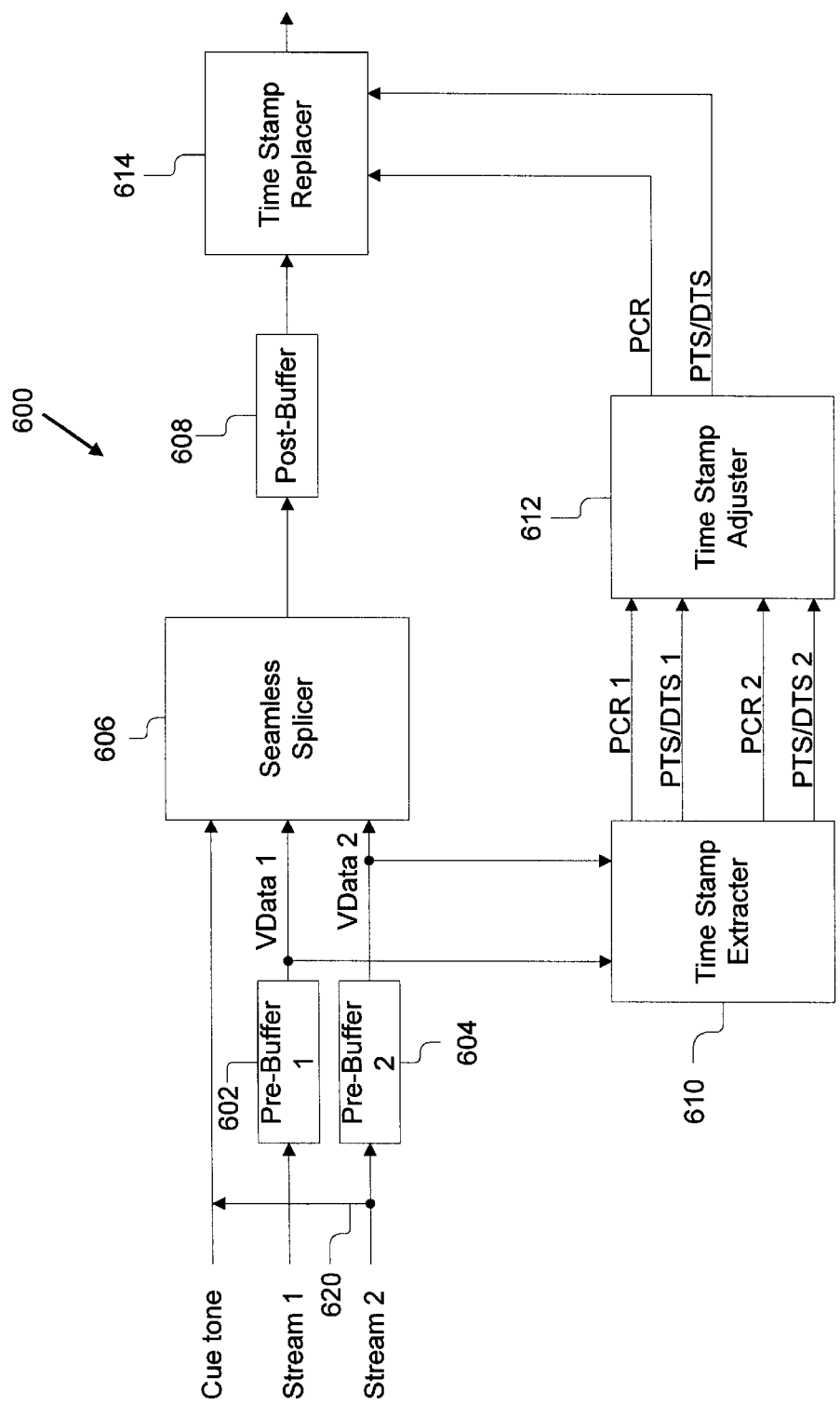
FIG. 6 is a block diagram of a preferred embodiment of a system for splicing bitstreams according to the present invention.

Referring now to FIG. 6, a preferred embodiment of the splicing system 600 of the present invention is shown. The preferred embodiment of the splicing system 600 preferably comprises a first pre-buffer 602, a second pre-buffer 604, a seamless splicer 606, a post-buffer 608, a time stamp extractor 610, a time stamp adjuster 612, and a time stamp replacer 614. As shown in FIG. 6, the present invention advantageously has the first pre-buffer 602, the second pre-buffer 604, and the post buffer 608. This configuration is particularly advantageous because it allows the seamless splicer 606 to perform essentially real-time re-encoding. The first pre-buffer 602 has an input and an output. The input of the first pre-buffer 602 is preferably coupled to receive a first bitstream. The output of the first pre-buffer 602 is coupled to a first input of the seamless splicer 606. The second pre-buffer 604 similarly has an input an output. The input of the second pre-buffer 604 is coupled to receive a second bitstream. The output of the second pre-buffer 604 is coupled to a second input of the seamless splicer 606. A third input of the seamless splicer 606 is coupled to receive a cue tone signal. In alternate embodiments, the cue tone signal may be extracted from the second bitstream signal as indicated by signal line 620. The first and second pre-buffers 602, 604 are preferably buffers and each has a size for holding frames of video data. The data provided in the first and second bitstreams to the first and second pre-buffers 602, 604 is typically in coded order. In order to perform splicing, the assignment of spliced picture location must be known well ahead of time. This buffering allows the present invention to know the splice point ahead of time.

The seamless splicer 606 receives both the first stream of data buffered by the first pre-buffer 602 and this signal is referred to as Vdata1, and also the second stream of data buffered by the second pre-buffer 604 and this signal is referred to as Vdata2. The seamless splicer 606 switches between outputting the Vdata1 signal and outputting the Vdata2 signal in response to the cue tone signal. The details of the seamless splicer 606 will be described more particularly below with reference to FIGS. 7 and 8. The output out of the seamless splicer 606 is coupled to the input of the post-buffer 608.

The post-buffer 608 is preferably a buffer of a conventional type. The post-buffer 608 is preferably about the same size as the first pre-buffer 602. The post-buffer 608 in combination with the first and second pre-buffers 602, 604 are used to regulate the transmission data through the seamless splicer 606. One key idea behind the present invention is the use of long lead time buffering of live stream and do real-time or non-real-time off-line reconstruction of anchor frames from the given P and B pictures. This lead-time is created using the first and second pre-buffers 602, 604 and the post-buffer 608.

The output of the first pre-buffer 602 and the output of the second pre-buffer 604 are also coupled to inputs of the time stamp extractor 610. The time stamped extractor 610 removes timing data from the Vdata1 signal and the Vdata2 signal. In particular, signals such as the program clock reference (PCR) and the presentation time stamp (PTS/DTS) signals are removed from either the Vdata1 signal of the Vdata2 signal for further processing. The program clock reference signal is a signal used to indicate what time it is. In other words, the program clock reference signal identifies a clock signal that can be used for timing and decoding of the video stream. The PTS/DTS signals are used to indicate when particular frames or pictures are to be displayed. Usually this refers to the time stamps encoded in the bitstream. However, in some applications, where the absolute presentation time of a picture depends on the splicing point (or switch time), PTS here refers to the time where the corresponding picture should be presented in the resulting spliced stream. This value may have no relation with the PTS value encoded in the bitstream. In other words, the PTS/DTS signals indicate the relative sequence in time for the frames or pictures. The time stamp extractor 610 preferably has a plurality of outputs to provide these timing signals, one set for each stream. The time stamp extractor 610 receives the Vdata1 signal of the Vdata2 and extracts a PCR and a PTS/DTS signal for both the first bitstream and for the second bitstream. These signals are provided on respective outputs of the time stamp extractor 610. The time stamp extractor 610 is of a conventional type known to those skilled in the art. The notable difference is that there is a time stamp extractor for each video data stream.

Figure 15:
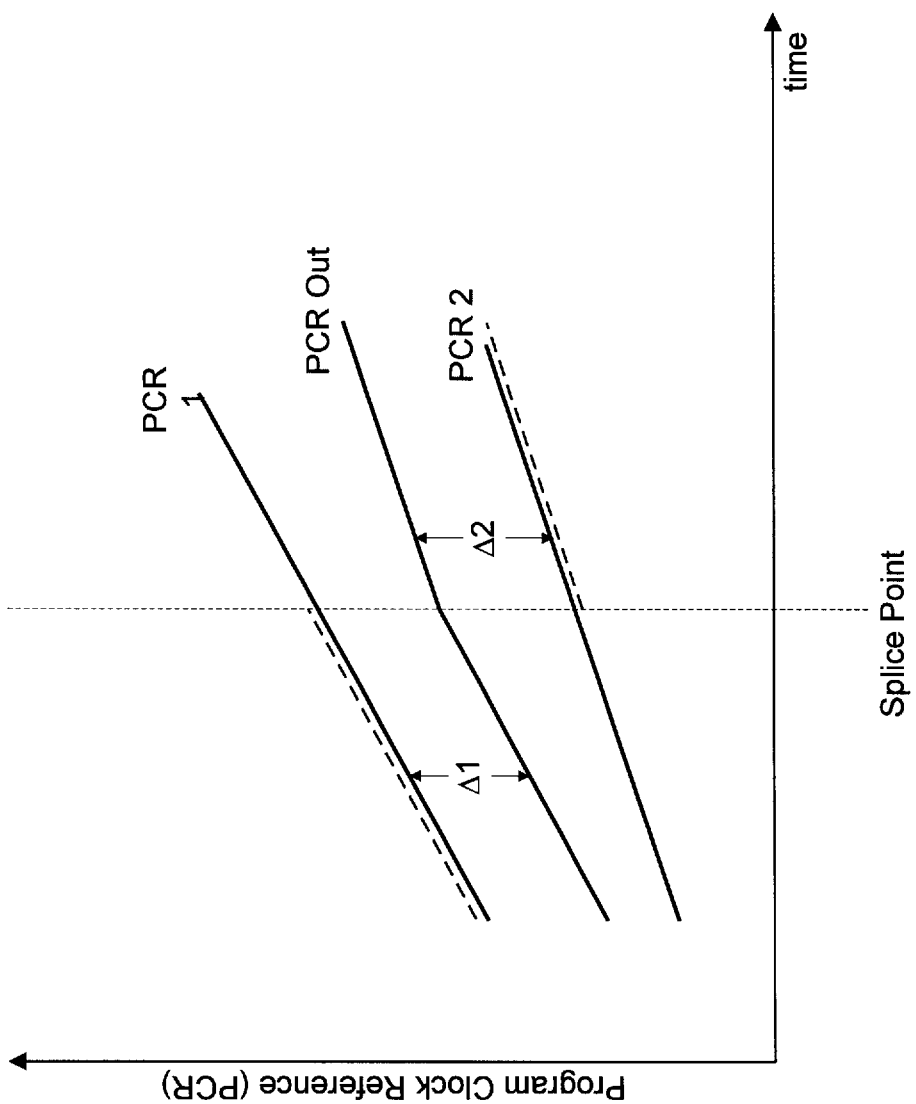
FIG. 15 is graph showing received and adjusted program clock reference and presentation time stamp signals according to the present invention.

The time stamp adjuster 612 preferably has a plurality of inputs and a pair of outputs. The inputs of the time stamp adjuster 612 are preferably coupled to the outputs of the time stamp extractor 610. The time stamp adjuster 612 receives a PCR signal and PTS/DTS signal for each video data stream from the time stamp extractor 610 and outputs one PCR signal and one PTS/DTS signal. The time stamp adjuster 612 also receives the cue tone signal (not shown) such that the time stamp adjuster 612 can adjust the PCR signal and PTS/DTS signal during the interval when the second bitstream is spliced into the first bitstream. The time stamp adjuster 612 performs time stamp correction to adjust the time stamps (PCR, PTS, DTS) from the incoming bitstreams so as to provide a continuous time base in the output spliced stream. The time stamp adjuster 612 performs time stamp correction by adjusting the time stamps (PCR, PTS, DTS) from the incoming bitstreams so as to provide a continuous time base in the output spliced stream. The time stamp adjuster 612 does so by adjusting the PCR and PTS/DTS signals from both the first bitstream and the second bitstream to generate a new time base and presentation times. In this manner, the time stamp adjuster 612 is able to output a PCR and PTS/DTS signals that can be used by any MPEG-2 decoder in decoding the spliced bitstream. The time stamp adjuster 612 will be described in more detail below with reference to FIGS. 11 and 15.

The outputs of the time stamp adjuster 612 are coupled to respective inputs of the time as stamp replacer 614. The time stamp replacer 614 has an additional input coupled to the output of the post-buffer 608. The time stamp replacer 614 receives the video data bitstream from the post-buffer 608 and combines it with the adjusted PCR and the PTS/DTS timing signals to produce a single transmission signal that is MPEG-2 compliant. The time stamp replacer 614 operates in a conventional manner and could be anyone of the existing conventional circuits used to perform a time stamped placing function.

Figure 7:
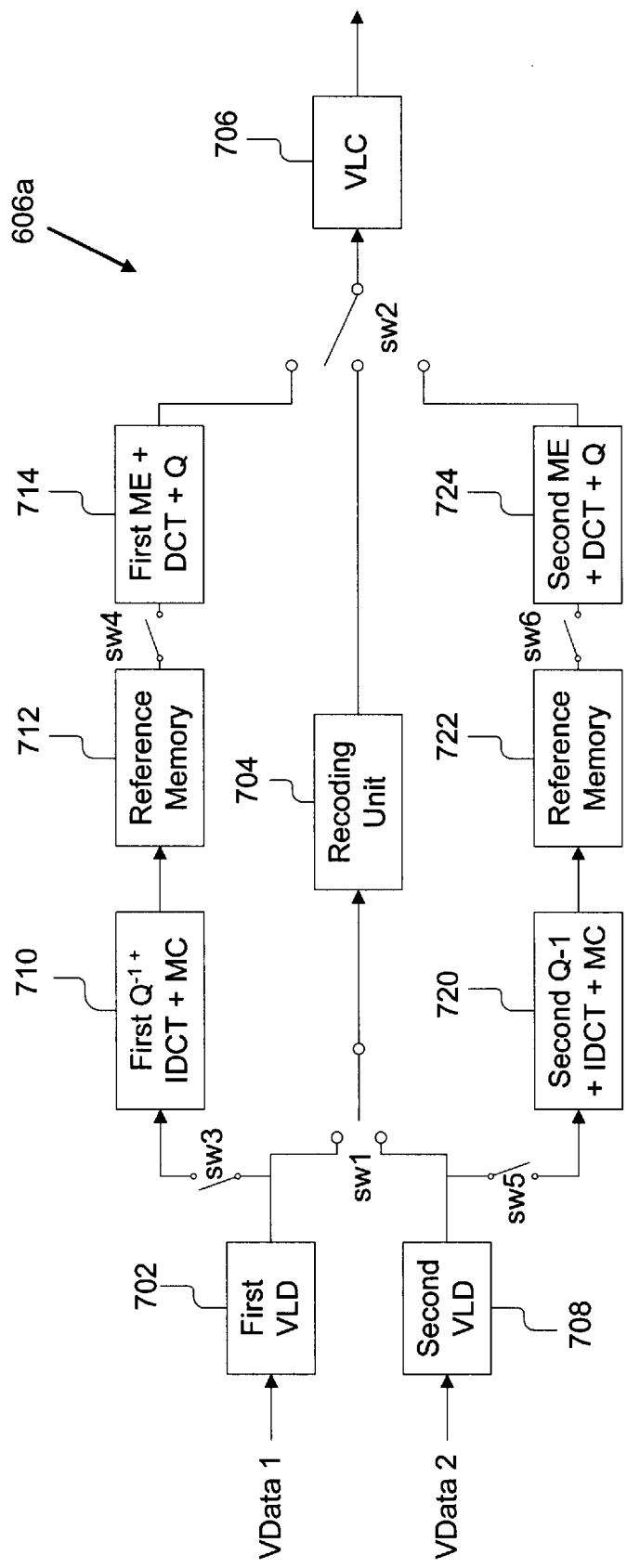
FIG. 7 is a block diagram of a first and preferred embodiment of the data processing portions of a seamless splicer constructed in accordance with the present invention.

Referring now to a FIG. 7, a first and preferred embodiment of the seamless splicer 606a is shown. More particularly, FIG. 7 shows the data paths provided within the seamless splicer 606a. The preferred embodiment of the seamless splicer 606a comprises: a first variable length decoder 702, a second variable length decoder 708, a recoding unit 704, a variable length encoder 706, first and second inverse transformers 710, 720, a first and second reference memories 712, 722, and first and second transformers 714, 724. Collectively, the first inverse transformer 710, the first reference memory 712, and the first transformer 714 provide a first anchor frame re-generation unit, and the second inverse transformer 720, the second reference memory 722, and the second transformer 724 form a second anchor frame re-generation unit. The seamless splicer 606a further comprises a plurality of switches sw1, sw2, sw3, sw4, sw5 and sw6 to provide various paths through which to route video data to the output of the seamless splicer 606a. The seamless splicer 606a will first be described with respect to its constituent components and data paths using FIG. 7 and then its operation and control with regard to FIGS. 9 and 10.

The first variable length decoder 702 preferably has an input and an output. The input of the first variable length decoder 702 is preferably coupled to the output of the first pre-buffer 602 to receive the Vdata1 signal. The first variable length decoder 702 performs variable length decoding of the Vdata1 signal to produce DCT coefficients and motion vectors. The first variable length decoder 702 is one of various conventional types known to those skilled in the art. The output of first variable length decoder 702 is coupled to the third switch sw3 and a node of the first switch sw1. The third switch sw3 couples the output of the first variable length decoder 702 to an input of the first inverse transformer 710 when the third switch sw3 is closed. The first switch sw1 couples the output of the first variable length decoder 702 to an input of the recoding unit 704 in one position.

The second variable length decoder 708 is similarly coupled to the fifth switch sw5 and a node of the first switch sw1. The second variable length decoder 708 preferably has an input and an output. The input of the second variable length decoder 708 is coupled to the output of the second pre-buffer 604 to receive the Vdata2 signal. The second variable length decoder 708 performs variable length decoding of the Vdata2 signal to produce DCT coefficients and motion vectors. The second variable length decoder 708 is also one of various conventional types known to those skilled in the art, and may be identical to the first variable length decoder 702. The fifth switch sw5 couples the output of the second variable length decoder 708 to an input of the second inverse transformer 720 when the fifth switch sw5 is closed. The first switch sw1 couples the output of the second variable length decoder 708 to the input of the recoding unit 704 in a second position. In a third position, the first switch sw1 is open and coupled neither the first or second variable length decoders 702, 708 to the recoding unit 704.

Figure 16:
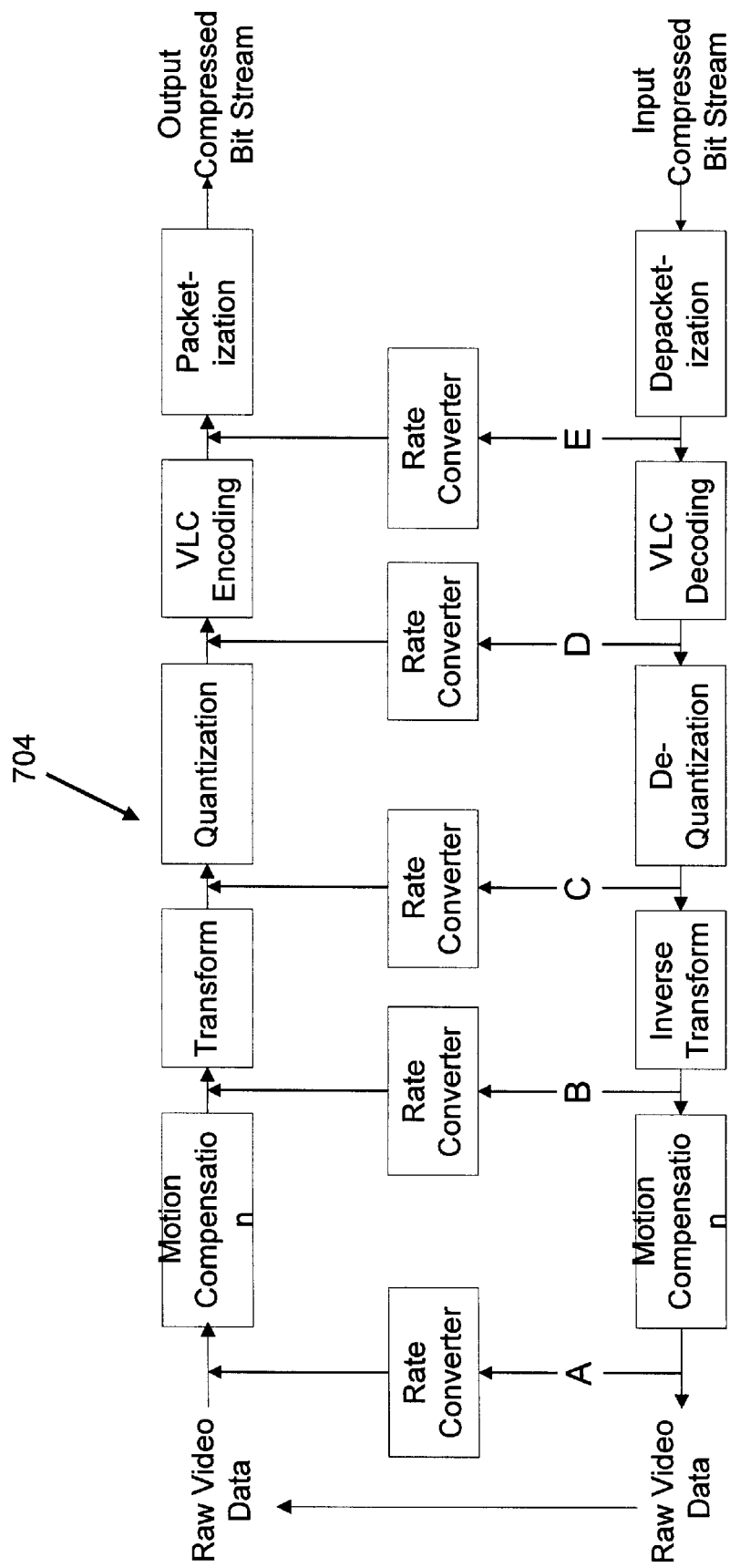
FIG. 16 is block diagram of possible embodiments for the recoding unit of the present invention.

The input of the recoding unit 704 is coupled to switch sw1 and the output of the recoding unit 704 is coupled to a node of the second switch sw2. The recoding unit 704 preferably performs rate conversion on the input bitstreams to eliminate buffer compliance and rate mismatch problems that may occur due to splicing. By recoding the first bitstream, the first second bitstream or both the first and second bitstreams or by variably recoding either or both of the first and second bitstreams, the present invention ensures that the decoder buffer will not under flow or overflow. For the present invention, recoding is defined in its broadest sense to include partial decoding, re-coding, re-quantization, re-transforming and re-encoding. Referring now to FIG. 16, each of these type of recoding are defined with more particularity. FIG. 16 is used to show various possibilities for re-coding. Some of the elements shown may also be needed for decoding and encoding of the video data. Hence in actually implementation, these common elements may be shared between the recoder 704 and the decoder/encoder 702, 704, 706. Partial decoding refers to path E where the bitstream is partially decoded, decode system syntax, and video syntax down to the picture header to perform frame accurate flexible splicing. Re-coding refers to path D where variable length encoding and decoding are performed and the DCT coefficients may be truncated to zero without even going through the inverse quantization steps. This approach requires the least processing, but in general causes the greatest amount of quality degradation. Re-quantization refers to path C where variable length encoding, dequantization, quantization and decoding are performed but no transform coding is used. The transform coefficients (DCT coefficients) are requantized before VLC encoded back. This is the approach preferably used for the recoding unit 704. Re-transformation refers to path B where variable length encoding, de-quantization, inverse transform, transform coding, quantization and decoding are performed. The video frames are constructed without using motion compensation. In the case of B or P pictures, this would mean some of the coded blocks are motion estimated residual errors. Some form of spatial filtering may be used before forward transform coding is used in the encoding process. Re-encoding refers to path A where the bitstreams are complete decoded to raw video and then encoded including the use of motion compensation. Each of the paths A, B, C, D, E includes a rate converter for adjusting the rate of the bitstream to ensure buffer compliance. Each of the rate converters may be different. For example, the rate converter on path A may be a spatial filter and the rate converter on path C may perform a quantization step size adjustment while the rate converter on path D performs high frequency elimination. Those skilled in the art will also recognize that the components of the recoding unit 704 used (e.g., the path through the recoding unit 704) could also be variably controlled to provide variable bit rate conversion using the recoding unit 704. In various embodiments, the recoding unit 704 may include all, only some or any combination of these components according to which of re-coding, re-quantization, re-transforming and re-encoding is performed.

The present invention is particularly advantageous because of its use of the recoding unit 704 to eliminate both the rate mismatch problems and decoder buffer compliance problems of the prior art. Specifically, both problems are those of determining the number of bits allowed for encoding a video frame so that the decoder buffer does not over or under flow during the real time transmission. The buffer compliance problem focuses on what happens during and around the splicing point, and the rate matching problem focuses on the entire operation. For example, if the network feed and the stored bitstreams have different rates, if no further re-coding or bit stuffing is used, the receiving decoder buffer would either over or under flow. It is important to point out that the present invention solves the rate mismatch problem whether the two participating bitstreams in the splicing operation have a constant bit rate, and even for the general case where the two bits streams have variable bit rates. For splicing two variable bit rate streams together, the rate matching operation is really a process of shaping the bitstream rate of the second stream so that the resulting bit rate profile fits the available bandwidth. Both bit reduction (through re-coding) and bit stuffing (through filler data or filler packet insertion) can be used, depending on the relationship between the first bitstream rate and the second bitstream rate. If the first stream is part of a statistically multiplexed bitstream, its share of the overall bandwidth is determined by the statistical multiplexer, which may be in a remote location. If splicing replaces the first stream with a second one, the available bandwidth may or may not be the same as the bit rate of the new stream. These cases are handled as follows. First, if the available bandwidth left open by the first stream, after the splicing, is less than the bit rate of the second stream, there are several alternatives: 1) perform re-coding on the second stream so that the resulting bit rate profile is 'shaped' to fit into the available bandwidth left open by the first stream; 2) perform recoding on all of the video programs in the same multiplex so that the available bandwidth for the second stream is increased to the level of the second stream; 3) perform a combination of the above two alternatives: re-code both the second stream and the rest of the streams in the multiplex such that the overall bit rate of the multiplex fits a constant bandwidth. Second, if the available bandwidth left open by the first stream, after the splicing, is more than the bit rate of the second stream, there are also several alternatives: 1) add stuffing bytes into the video stream. In the MPEG-2 case, this would mean either adding stuffing bytes in the elementary stream or adding null packets; 2) use the spare bandwidth to carry additional information, such as non-real-time data, or auxiliary data that enhance the capability of the receiver. Again, the re-coding done to achieve rate matching is fundamentally identical to that of buffer compliance problem. Thus, the present invention ensures that the decoder buffer does not over or under flow, regardless whether it is at splicing point or before/after the splicing.

The second switch sw2 has three possible positions: closed on a first node, closed on a second node, or closed on the third node. One end of the second switch sw2 is coupled to the input of the variable length encoder 706. The variable length encoder is of a conventional type and performs variable length coding on input values of DCT coefficients and motion vectors. The output of the variable length encoder 706 provides the output of the seamless splicer 606.

As noted above, the input of the first inverse transformer 710 is coupled to the third switch sw3. This component performs de-quantization, inverse discrete cosine transformation, motion compensation and re-ordering. The first inverse transformer 710 receives a bitstream that is in coded order but that has been variable length decoded. The first inverse transformer 710 operates on the bitstream to generate raw video images and stores them in the reference memory 712. In the preferred embodiment, the first inverse transformer 710 includes a de-quantization unit coupled to an inverse discrete cosine transformation unit, and the inverse discrete cosine transformation unit coupled to a motion compensation unit. Each of these units can be of a conventional type known in the art. The output of the first inverse transformer 710 is coupled to the reference memory 712.

The first reference memory 712 is preferably a memory of a conventional type such as random access memory and is used to store raw video data. The reference memory 712 is preferably sized such that it can hold three frames of video data. The first reference memory 712 has an input coupled to the output of the first inverse transformer 710, and an output coupled to the input of the first: transformer 714 by the fourth switch sw4. The fourth switch sw4 allows the reference memory 712 to be constructed for the given bitstream, but not used for re-encoding until the fourth switch sw4 is closed.

As noted above, the input of the first transformer 714 is coupled to the fourth switch sw4. This component performs motion estimation, discrete cosine transformation, and quantization. The first transformer 714 receives a raw video bitstream in display order from the first reference memory 712 via the fourth switch sw4. The first transformer 714 re-orders the bitstream and operates on the bitstream to covert it to a compressed video bitstream before outputting them to the second switch sw2. In the preferred embodiment, the first transformer 714 includes reordering unit coupled to a motion estimation unit that in turn is coupled to a discrete cosine transformation unit and a quantization unit. The output of the quantization unit provides the output of the first transformer 714. The first inverse transformer 710, the first reference memory 712, and the first transformer 714, thus, allows any frames routed throughout them to be re-encoded as desired.

The second inverse transformer 720 is preferably similar to the first inverse transformer 710 in functionality but is used for performing de-quantization, inverse discrete cosine transformation, motion compensation and re-ordering of the second bitstream. The second inverse transformer 720 has an input coupled to switch sw5 and an output coupled to the second reference memory 722. The second reference memory 722 performs a similar function to the first reference memory 722 and its output is coupled by the sixth switch to the second transformer 724. The second transformer 724 is preferably identical to the first transformer 714 and its output is coupled to a final node of the second switch sw2. The second inverse transformer 720, the second reference memory 722, and the second transformers 724, thus, allow any frames routed through them to be re-encoded as desired. Thus, depending on the node to which the second switch sw2 is connected (and other switch settings), it may provide either a requantized version of the first bitstream from the first variable length decoder 702, requantized version of the second bitstream from the second variable length decoder 708, a re-encoded version of the first bitstream from the first transformer 714 or a re-encoded version of the second bitstream from the second transformer 724.

While FIG. 7 has shown the preferred embodiment of the splicer 606a as including a plurality of switches sw1–sw6, those skilled in the art will recognize that the invention may be implemented as electronically controlled physical switches or in software. In either case, when a switch is open, the operation connected to the output side of the switch sw1–sw6 need not be performed.

Figure 8:
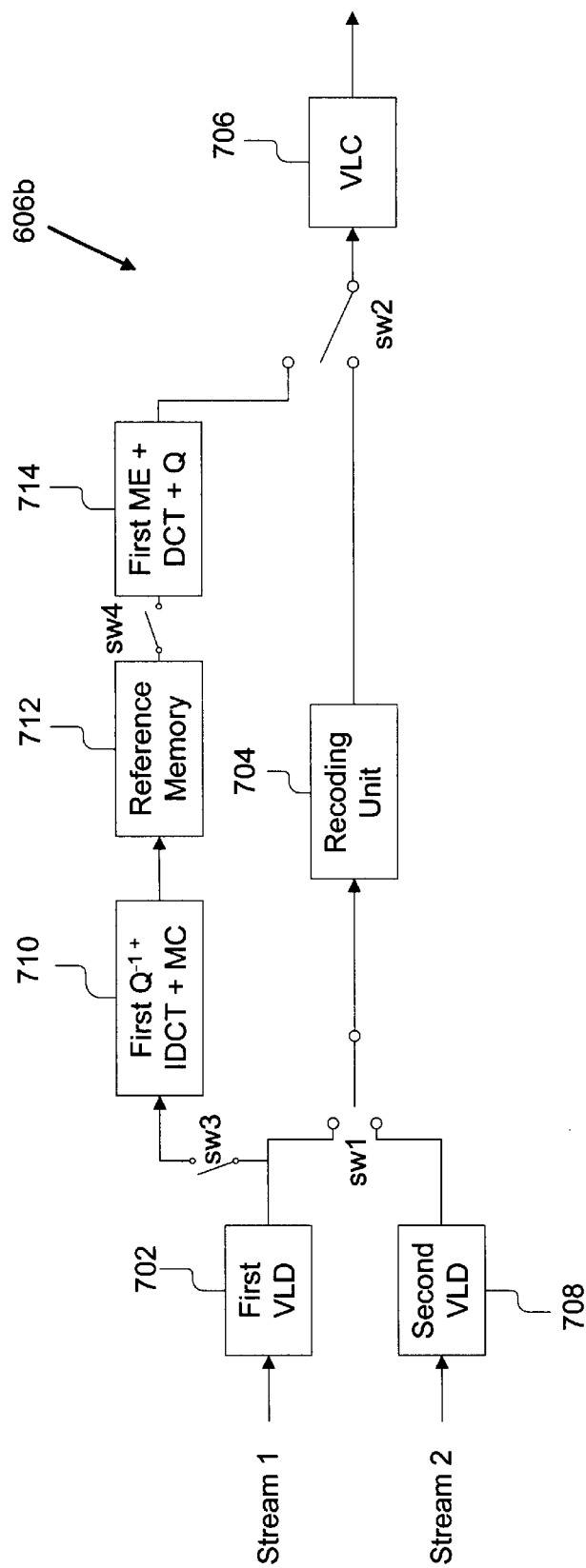
FIG. 8 is a block diagram of a second embodiment of the data processing portions of the seamless splicer constructed in accordance with the present invention.

Referring now to FIG. 8, a second alternate embodiment for the seamless splicer 660b is shown. In this alternate embodiment, like reference numerals and terms consistent with the above description of the components of the first seamless splicer 606a of FIG. 7 are used for ease of understanding and convenience. The second embodiment of the seamless splicer 606b assumes that the second bitstreams Vdata2 will always begin in coded order with an I-picture and end with an B-pictures", and any B pictures immediately following the first I-picture do not use the previous frame. (This assumes the first GOP in the second stream is a closed GOP.). For example, a common case of this where the first bitstream is a live video feed and the second bitstream is an already stored and formatted advertisement. Since the second bitstream has been created, encoded and stored long before transmission, it can be sure to be formatted so that the above conditions are met. Such an assumption will eliminate the need for re-encoding of the second bitstream. More particularly, such an assumption eliminates the possibility of the type of splicing described above with reference to FIGS. 5B, 5C, 5E and 5F. Therefore, the second inverse transformer 720, the second reference memory 722, the second transformer 724 and the to fifth and sixth switches sw5, sw6 may be eliminated and the second switch sw2 simplified in this second embodiment of the seamless splicer 606b. As shown in FIG. 8, the second switch sw2 has three possible states including coupled to a first node to connect to the first transformer 714, coupled to a second node to connect with the recoding unit 704.

Figure 9:
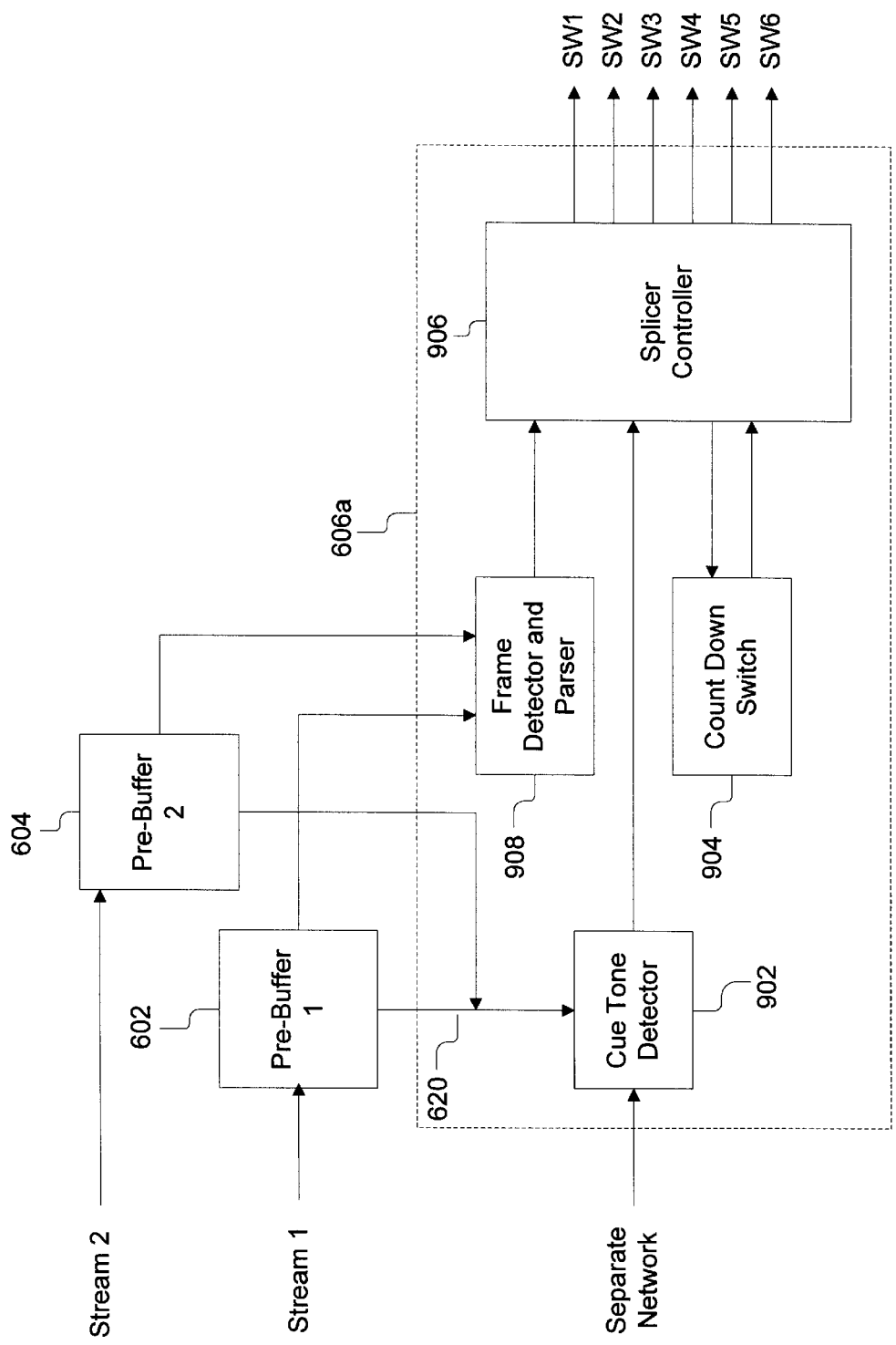
FIG. 9 is a block diagram of a preferred embodiment of the control portions corresponding to the first and preferred embodiment of the seamless splicer of the present invention.

Referring now to FIG. 9, a preferred embodiment for the control portions of the seamless splicer 606a are described. The seamless splicer 606a further comprises a cue tone detector 902, a count down switch 904, a splicer controller 906 and a frame detector and parser 908. These components are coupled together to receive and detect signals out of the first and second bitstreams, and in response, generate signals to control the switches sw1–sw6 to provide alternate data paths through the seamless splicer 606a such that the spliced bitstream output provides the frame accurate splicing between the first bitstream second bitstream.

The cue tone detector 902 has an input and output. For convenience and ease of understanding, FIG. 9 illustrates the cue tone detector 902 as having two inputs, one for each embodiment. In one embodiment, the input is coupled to separate network (not shown) to receive a cue tone signal. In the other embodiment, the input of the cue tone detector 902 is coupled to line 620 to received a cue tone signal from either the first pre-buffer 602 or the second pre-buffer 604. That cue tone detector 902 generates signal at its output to indicate that a cue tone signal has been detected. In one embodiment, the cue tone detector 902 is a comparator and latch that compare the signal on the input to predefined definitions for the cue tone signal and output a signal for predetermined amount time upon detection of a matching comparison. The output of the cue tone detector 902 is preferably coupled to an input of splicer controller 906.

The frame detector and parser 908 has first and second inputs and an output. The first input of frame detector and parser 908 is coupled to the output of the first pre-buffer 602 and the second input of the frame detector and parser 908 is coupled to the output of the second pre-buffered 604. The frame detector and parser 908 preferably includes a plurality of comparators for comparing the first and second bitstreams received from the first pre-buffer 602 and the second pre-buffer 604, respectively, to determine the picture or frame type and the presentation time stamp. The picture coding type information (I, P or B) is sent in the picture header within the bitstream. The frame detector and parser 908 parses each bitstream and scans the header to find out the picture coding type. This information is provided at the output of frame detector and parser 908. The output of the frame detector and parser 908 is coupled to the input of the splicer controller 906 and is used in determining the settings of the six switches sw1–sw6. In one embodiment, the frame detector and parser 908 only detects anchor frames during the count down and does not detect B-frames during this time period.

The countdown switch 904 has an input and an output. The countdown switch 904 preferably has its input coupled to an output of the splicer controller 906, and its output coupled to an input of the splicer controller 906. The countdown switch 904 remains idle until enabled by a control signal applied at its input from the slice controller 906. Once the enable signal is asserted, the countdown switch 904 begins to count a predetermined amount of time until the splice point is reached. A predetermined amount of time is preferably an amount sufficient to create within the reference memories 712, 722 data sufficient to allow re-encoding. Once the predetermined amount of time has lapsed, such is indicated by countdown switch 904 to the splicer controller 906 by asserting a signal on its output.

The splicer controller 906 preferably has a plurality of inputs and a plurality of outputs. The plurality the inputs of the splicer controller 906 are coupled to the outputs of the cue tone detector 902, the countdown switch 904, and the frame detector and parser 908 as has been described in detail above. The splicer controller 906 preferably has at least one output corresponding to each of the first through sixth switches sw1–sw6 so that the splicer controller 906 can position the first through sixth switches sw1–sw6 in the positions described above with reference to FIG. 7. The splicer controller 906 is preferably composed of combination logic. In alternate embodiment, the splicer controller 906 is a microcontroller programmed to control the six switches sw1–sw6 in accordance with the state diagram of FIG. 10 which will be described below. In addition to the operations described with reference to FIG. 10, the splicer controller 906 also detects the presentation time stamps (PTS) located within the first and second bitstreams received from the first pre-buffer 602 and the second pre-buffer 604, respectively. From the PTS, the splicer controller 906 is able to determine the splice time and appropriately open and close the first through sixth switches sw1–sw6. Those skilled in the art will recognize that to the splicer controller 906 determines the splice time based on the cue tone input. The PTS is usually sent only occasionally just to correct the drift between the encoder and decoder clocks. Since there is no guarantee that a PTS will be sent for each picture, the splicer controller 906 also calculates an approximate PTS using its own clock, the last sent PTS, and the inter-picture interval. Those skilled in the art will also recognize that a similar state machine to that described below with reference to FIG. 10 may be created to control the switches of the second embodiment of the seamless splicer 606b shown in FIG. 8.

Figure 10:
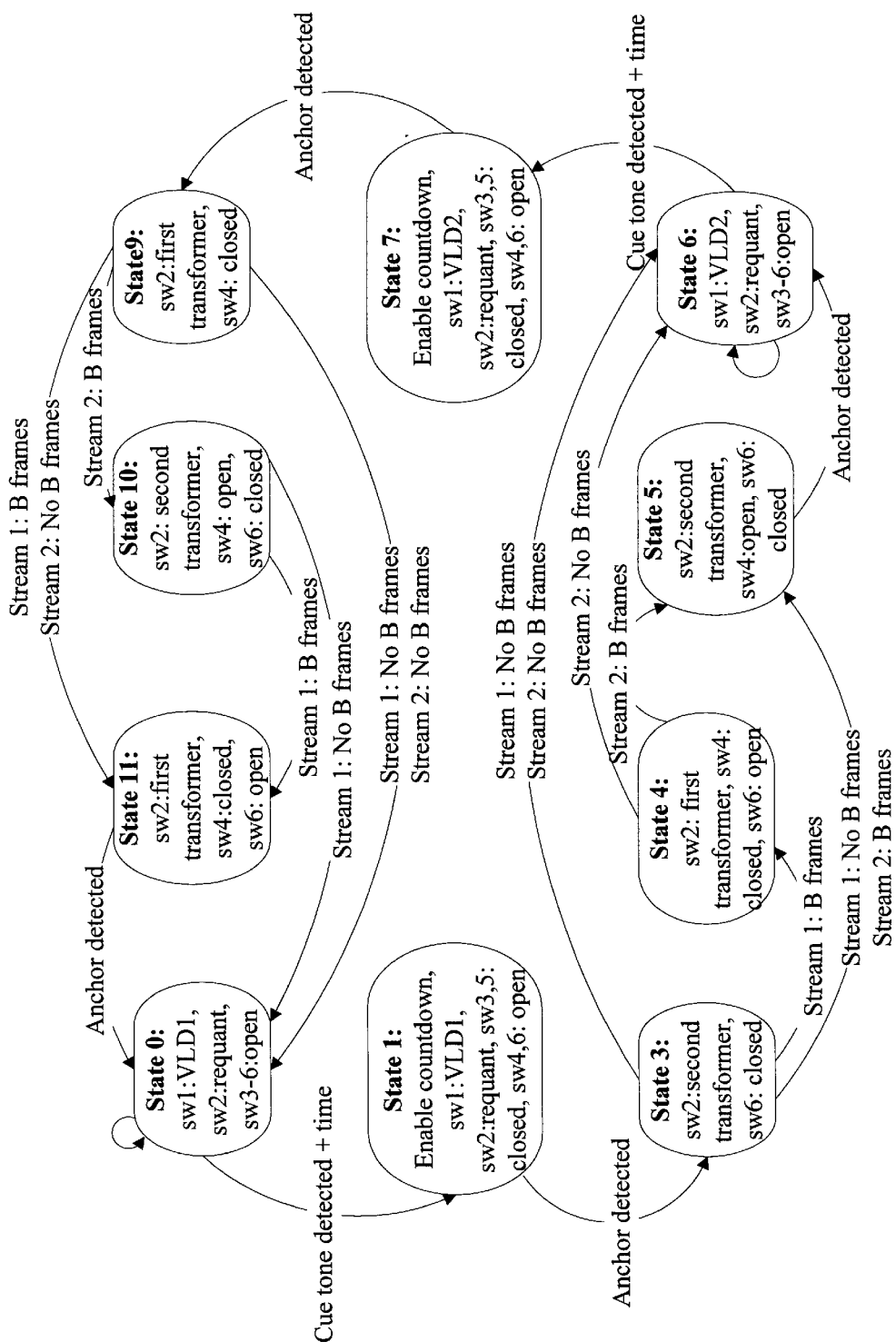
FIG. 10 is a state diagram of the splicer controller constructed in accordance with the preferred embodiment of the present invention.

FIG. 10 illustrates a state diagram for the preferred operation of the splicer controller 906. The splicer controller 906 preferably has eleven states and in each state the splicer controller 906 selectively activates one or more of the switches sw1–sw6. Typically, the splicer controller 906 would operate in STATE ZERO. In STATE ZERO, the first switch sw1 is positioned to provide the output of the first variable length decoder 702 to the recoding unit 704; the second switch sw2 is positioned to coupled the recoding unit 704 to the variable length encoder 706, and the third through sixth switches sw3–sw6 are positioned open. The splicer controller 906 would remain in STATE ZERO and continue to re-encoding data from the first bitstream. Once a cue tone has been detected and after a predetermined amount of time, the splicer controller 906 transitions from STATE ZERO to STATE ONE. Preferably, the countdown does not start right away. Usually, the cue tone is sent with a significant lead-time before the splicing point. For example, as much as 10 seconds before switching need to begins, if a lead time of one second is needed to fill the reference memories 712, 722 then the countdown would be enabled 9 seconds after the cue tone is received. In other words, the splicer controller 906 would not transitions from STATE ZERO to STATE ONE until the count down needed to begin, or after 9 seconds.

In STATE ONE, the first switch sw1 continues to couple the first variable length decoder 702 to the recoding unit 704, the second switch sw2 continues to couple the recoding unit 704 to the variable length encoder 706, and the fourth and the sixth switches sw4, sw6 continue to be positioned opened. The countdown switch 904 is enabled, and the third and the fifth switches sw3, sw5 are changed to the closed position to provide the decoded first bitstream to the first reference memory 712 and the decoded second bitstream to the second reference memory 722, respectively. Note that actually only anchor frames need to be processed to build up the reference frame. The B pictures can be skipped during this countdown period. The splicer controller 906 remains in STATE ONE until the countdown switch 904 signals that the current picture is beyond the slice point. Once such a signal is received by the splicer controller 906 from the countdown switch 904, the splicer controller transitions to STATE THREE. For the use of understanding and convenience, in describing the remaining states only the changes in switch position or operation from the previously will be noted.

In STATE THREE, the sixth switch sw6 is closed to provide raw video data to the second transformer 724, and the second switch is positioned to coupled the output of the second transformer 724 to the input of the variable length decoder 706. The second transformer will choose the first anchor frame in the second stream after the splice point to process. It is possible that the anchor frame is not in the reference memory 722 yet. In this case, the splicer 606a will need to wait for this frame to be stored in the reference memory 722. Thus, the splicer controller 906 changes the data path through the seamless splicer 606a to provide re-encoded frames from the second bitstream at the output. This continues until one of the following conditions occurs. First, if there are (1) no B-pictures after the detected anchor in the first bitstream with a PTS before the splice point, and (2) no B-pictures after the first anchor of the second bitstream with PTS after the splice point, then the splicer controller 906 transitions from STATE THREE to STATE SIX. This is the case illustrated in FIG. 5A where no re-encoding of B-pictures from either stream is necessary. This is done immediately without having to re-encode the first anchor frame after the spice point in the second stream has been re-encoded. Second, if there are (1) no B-pictures after the detected anchor in the first bitstream with a PTS before the splice point, and (2) B-pictures after the first anchor of the second bitstream with PTS after the splice point, then the splicer controller 906 transitions from STATE THREE to STATE FIVE. This is the case of FIG. 5B or 5C where it is not necessary to re-encode any frames from the first stream, but some frames of the second stream must be re-encoded. This done after the first anchor frame after the spice point in the second stream has been re-encoded. Finally, if there are B-pictures after the detected anchor in the first bitstream with a PTS before the splice point, the splicer controller 906 transitions from STATE THREE to STATE FOUR. This is the case of either FIGS. 5D, 5E or 5F, where it is necessary to re-encode some frames from the first stream, and it 11 may or may not be necessary to re-encode some frames of the second stream. This done after the first anchor frame after the spice point in the second stream has been re-encoded, if necessary.

In STATE FOUR, the second switch sw2 is positioned to couple the first transformer 714 to the variable length encoder 706. Also, the fourth switch sw4 is closed and the sixth switch sw6 is opened. In this state, the seamless splicer 606a provides the data that produces re-encoded frames from the first bitstream. The seamless splicer 606a remains in STATE FOUR until all the B-frames of the first bitstream after the last anchor frame but before splice point have been re-encoded. Once the last such B-frame of the first stream has been re-encoded, the splicer controller 906 transitions from STATE FOUR to either STATE FIVE or STATE SIX. If there are no B-pictures after the first anchor of the second bitstream with a PTS after the splice point, then the splicer controller 906 transitions to STATE FIVE to re-encode those frames. However, if there are B-pictures after the first anchor of the second bitstream with PTS after the splice point, then the splicer controller 906 transitions to STATE SIX and begins outputting the second bitstream without re-encoding but requantized.

In STATE FIVE, the second switch sw2 is coupled to connect the second transformer 724 to the variable length encoder 706. Also, the fourth switch sw4 is opened and the sixth switch sw6 is closed. In this state, the seamless splicer 606a returns to providing the re-encoded B-frames from the second bitstream at its output. After all the B-frames from the second bitstream up to the first anchor frame with a PTS after the splice point have been re-encoded, the splicer controller 906 transitions from STATE FIVE to STATE SIX.

In STATE SIX, the splicer controller 906 sets the first switch sw1 to couple the second video length decoder 708 to the input of the recoding unit 704. The splicer controller 906 also sets the second switch sw2 to couple the output of the recoding unit 704 to the input of the variable length decoder 706. Finally, the third to sixth switches sw3–sw6 are returned to the open position. In this state, the seamless splicer 606a outputs second bitstream re-coded such that it only passes through the second variable length decoder 708, the recoding unit 704 and the variable length encoder 706. The seamless splicer 606a remains in this state until another cue tone is detected and the same predetermined amount of time as in STATE ZERO has lapsed. Such a cue tone indicates the end of the digital picture insertion is coming and that the seamless splicer 606a will return to outputting the first bitstream. The slice controller 906 transitions from STATE SIX to STATE SEVEN upon detection of a cue tone and passage of the predetermined amount of time.

Those skilled in the art will recognize that STATES ONE to STATE FIVE relate to the entry point splicing and STATES SEVEN to STATE ELEVEN relate to the entry point splicing. These states are respectively equivalent except that the stream order is reversed.

In STATE SEVEN, the splicer controller 906 enables the countdown switch 904, the third and the fifth switches sw3, sw5 are closed to provide the decoded first bitstream and the decoded second bitstream to the first reference memory 712 and the second reference memory 722, respectively. The splicer controller 906 remains in STATE SEVEN until the countdown switch 904 signals that the current picture is beyond the slice point. Once such a signal is received by the splicer controller 906 from the countdown switch 904, the splicer controller 906 transitions to STATE NINE.

In STATE NINE, the fourth switch sw4 is closed to provide raw video data to the first transformer 714, and the second switch is positioned to coupled the output of the first transformer 1014 to the input of the variable length decoder 706. Thus, the splicer controller 906 changes the data path through the seamless splicer 606a to provide re-encoded frames from the first bitstream at the output. Similar to STATE THREE, this continues until one of the following conditions occurs. First, if there are (1) no B-pictures after the detected anchor in the second bitstream with a PTS before the splice point, and (2) no B-pictures after the first anchor of the first bitstream with PTS after the splice point, then the splicer controller 906 transitions from STATE NINE to STATE ZERO. This is the case illustrated in FIG. 5A where no re-encoding of B-pictures from either stream is necessary. This is done immediately without having to re-encode the first anchor frame after the spice point in the first stream has been re-encoded. Second, if there are (1) no B-pictures after the detected anchor in the second bitstream with a PTS before the splice point, and (2) B-pictures after the first anchor of the first bitstream with PTS after the splice point, then the splicer controller 906 transitions from STATE NINE to STATE ELEVEN. This is the case where it is not necessary to re-encode any frames from the second stream, but some frames of the first stream must be re-encoded. This done after the first anchor frame after the spice point in the first stream has been re-encoded. Finally, if there are B-pictures after the detected anchor in the second bitstream with a PTS before the splice point, the splicer controller 906 transitions from STATE NINE to STATE TEN. This is the case where it is necessary to re-encode some frames from the second bitstream, and it may or may not be necessary to re-encode some frames of the first stream. This done after the first anchor frame after the spice point in the first stream has been re-encoded, if necessary.

In STATE TEN, the second switch sw2 is positioned to couple the second transformer 724 to the variable length encoder 706. Also, the fourth switch sw4 is opened and the sixth switch sw6 is closed. In this state, the seamless splicer 606a provides the data that produces re-encoded frames from the second bitstream. The seamless splicer 606a remains in STATE TEN until all the B-frames of the second bitstream after the splice point are detected. Once the last such B-frames is re-encoded, the splicer controller 906 transitions from STATE TEN to either STATE ELEVEN or STATE ZERO. If there are B-pictures after the first anchor of the first bitstream with PTS after the splice point, then the splicer controller 906 transitions to STATE ELEVEN to re-encode those frames. However, if there If there are no B-pictures after the first anchor of the first bitstream with PTS after the splice point, then the splicer controller 906 transitions to STATE ZERO and returns to outputting the first bitstream without re-encoding and only with requantization.

In STATE ELEVEN, the second switch sw2 is coupled to connect the first transformer 714 to the variable length encoder 706. Also, the fourth switch sw4 is closed and the sixth switch sw6 is opened. In this state, the seamless splicer 606a returns to providing re-encoded frames from the first bitstream at its output. Upon detecting an anchor frame in the first bitstream, the splicer controller 906 transitions from STATE ELEVEN to STATE ZERO.

Figure 11:
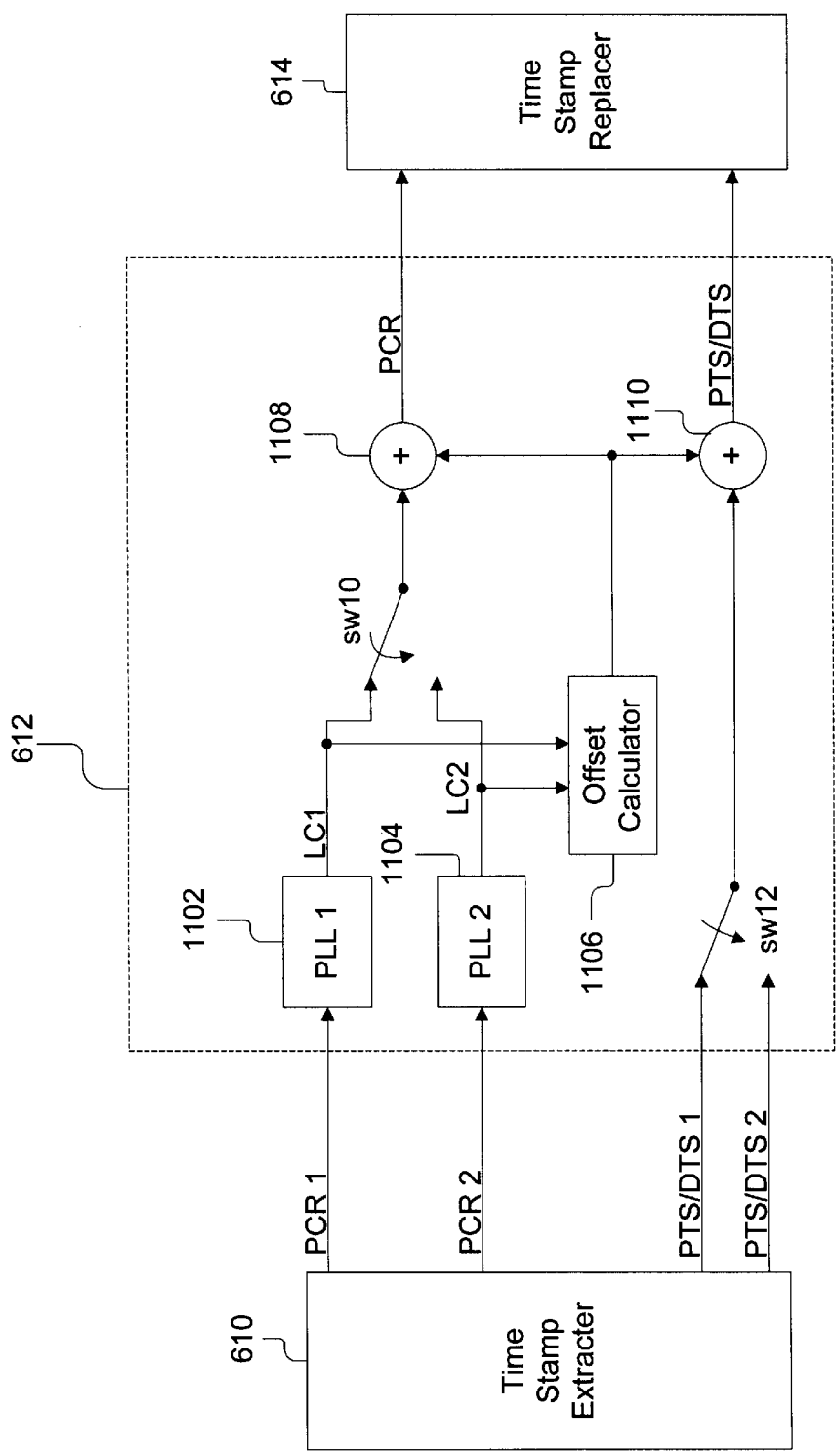
FIG. 11 is a block diagram of a preferred embodiment of a time stamp adjuster corresponding to the preferred embodiment of the present invention.

Referring now to FIG. 11, a preferred embodiment of the time stamp adjuster 612 is shown. The purpose, of the time stamp adjuster 612 is to perform time stamp correction. In other words, the time stamp adjuster 612 adjusts the time stamps (PCR, PTS, and DTS) from the incoming bitstreams so as to provide a continuous time base in the output-spliced stream. Referring also to the graphs of FIG. 15, the time bases (PCR) of the first input bitstream (PCR1), the second input bit stream (PCR 2) and the spliced stream (PCR Out) are shown. Each line represents the value of a counter incremented along time. Here, the slope represents the clock frequency (about 27 MHz for PCR), and the vertical position represents the phase of the clock. The slight difference in the slope of the first input bitstream (PCR1) and the second input bit stream (PCR 2) represents the drifting in clock frequency. If no time stamp correction is provided, the time base will have a abrupt change at the splice point, as signified by the dashed line 1500. With time stamp correction, the output time base is continuous. To achieve this, the present invention adds an offset to the input stream time base. In the example shown, before the splice point, an offset, A1, is added to the input PCR1 to form the PCR Out.

After the splice point, another offset, A2, is added to the input PCR 2 to form the output PCR Out. A1 and A2 are set such that the time base is continuous at the splice point.

FIG. 11 shows the block diagram for the preferred embodiment of the time stamp adjuster 612. The time stamp adjuster 612 comprises a first and second phase lock loops 1102, 1104, each with outputs a local clock that is phase locked to the incoming PCR signals. Therefore, the local clock (LC1) of the first phase lock loop (PLL) 1102 will track PCR1 and the local clock (LC2) of the second PLL 1104 will track to PCR2. The first and second phase lock loops 1102 are coupled to respective nodes of switch sw10 that alternatively provides either LC1 or LC2 to a first input of adder 1108. The first and second phase lock loops 1102 are also coupled to respective inputs of an offset calculator 1106. The offset calculator 1106 generates the offset, D, which is used in turn to generate the PCR Out by adding the offset to the incoming value from the switch sw10. The output of the offset calculator 1106 is coupled to a second input of the adder 1108. The output of the adder 1108 provides the PCR Out signal. The second switch sw12 has two nodes respectively coupled to receive the PTS/DTS signal from the first and second bitstreams. The other node of the second switch sw12 is coupled to the first input of the second adder 1110. The second input of the second adder 1110 is coupled to receive the offset from the offset calculator 1106. The second adder provides the adjusted PTS/DTS signal. The offset calculator 1106 provides the offset, D, so that the output PCR and PTS/DTS signals are formed by adding the offset to the incoming value from the switches, sw10, and sw12. At the time of splice, the offset calculator 1106 calculates the new offset value, D' according to the equation D'=D+C1−C2. After the splice, D' will be the new offset value used to adjust the PCR, PTS/DTS signals. The first and second switches sw10, sw12 select the PCR or PTS/DTS depending on which channel is being output. Since it takes some time for the first and second phase lock loops 1102, 1104 to track the input PCR, the phase lock loops 1102, 1104 need to start some time prior to the splice time. Conveniently, it can be started with the assertion of the countdown signal.

Figure 12A:
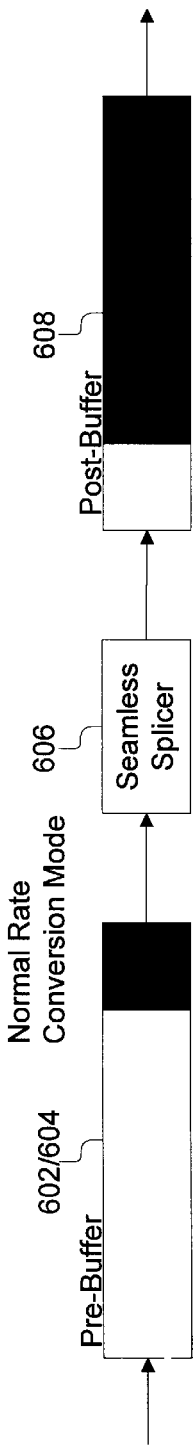
FIGS. 12A–12D show graphical representations of the pre-buffers, the splicer and the post-buffer illustrating the fullness of the pre-buffers and post-buffer at various times during the splicing process.
Figure 12B:
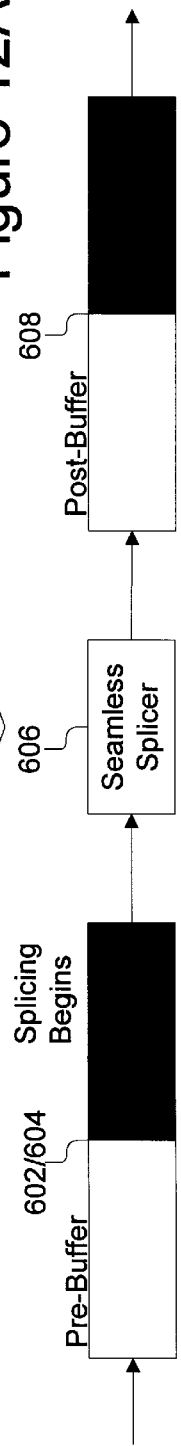
Figure 12C:
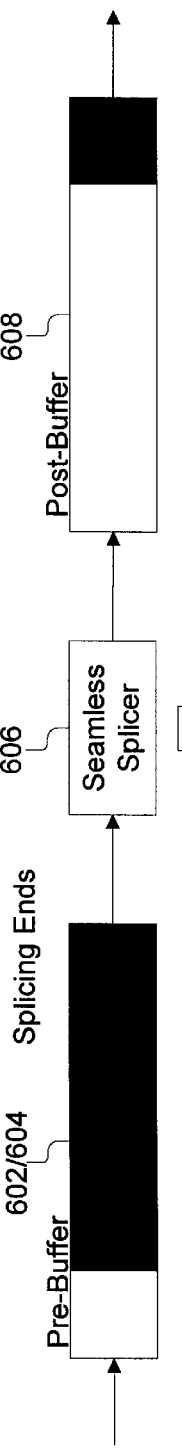
Figure 12D:
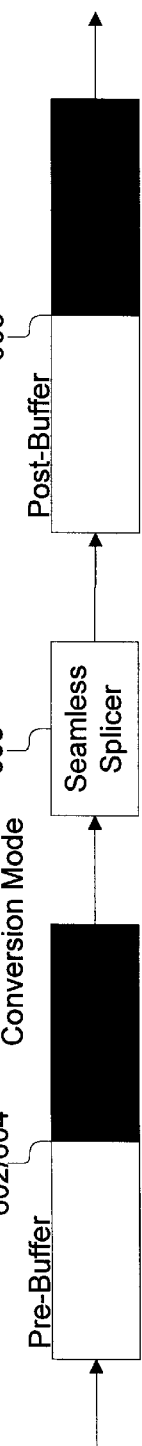

Referring now to FIGS. 12A–12D, the advantages of the present invention can be more clearly seen. FIGS. 12A–12D illustrate simplified diagrams of the splicing system 600 of the present invention showing the buffer fullness for the first and second pre-buffers 602, 604 and the post buffer 608 through the process of splicing two streams together. During the normal mode when no splicing is being performed, the seamless splicer 606 is performing rate conversion. In other words, only requantization is being performed so that as quickly as the spliced bitstream can be output is the rate at which the seamless splicer 606 processes the first and second bitstreams. This has the effect of maintaining the first and second pre-buffers 602, 604 at low or empty level while maintaining the post-buffer 608 a high or full level as shown in FIG. 12A. Once splicing begins, the seamless splicer 606 must perform re-encoding which is computationally more intensive and therefore requires more time for the seamless splicer 606 to process the same streams. Since the throughput of the seamless splicer 606 has decreased due to splicing, the fullness of the first and second pre-buffers 602, 604 increases to a medium level while the fullness of the post-buffer 608 decreases to a medium level as shown in FIG. 12B. Just before splicing (and thus re-encoding) ends, the fullness of the first and second pre-buffers 602, 604 increases to a high level while the fullness of the post-buffer 608 decreases to a minimum level as shown in FIG. 12C. However, now that the re-encoding is about to end, the seamless splicer 606 returns to the normal mode and is performing rate conversion which is computationally less intense so that the seamless splicer 606 will be able to reduce the fullness of the first and second pre-buffers 602 and increase the fullness of the post buffer 608 as shown in FIG. 12D. Eventually, the seamless splicer 606 will reduce the fullness of the first and second pre-buffers 602 and increase the fullness of the post buffer 608 back to the state shown in FIG. 12A. Therefore, the present invention is able to provide delayed, but effectively real time re-encoding without the complicated hardware required by such real-time decoder and encoders. When buffering is used, the seamless splicer 606 has many seconds to complete the above operation of reconstructing a coded B picture. If no buffering is used, the above operation must be completed in one frame time. The use of buffering significantly reduces the computation speed requirement of the seamless splicer 606. The buffer size determines the relative computation speed requirement. The higher the buffer size, the less the demand on the computation speed. From the above technique, we can see that in general, splicing of bitstreams does not require real-time re-encoding equipment, but such can be eliminated with properly sized buffers.

Figure 13:
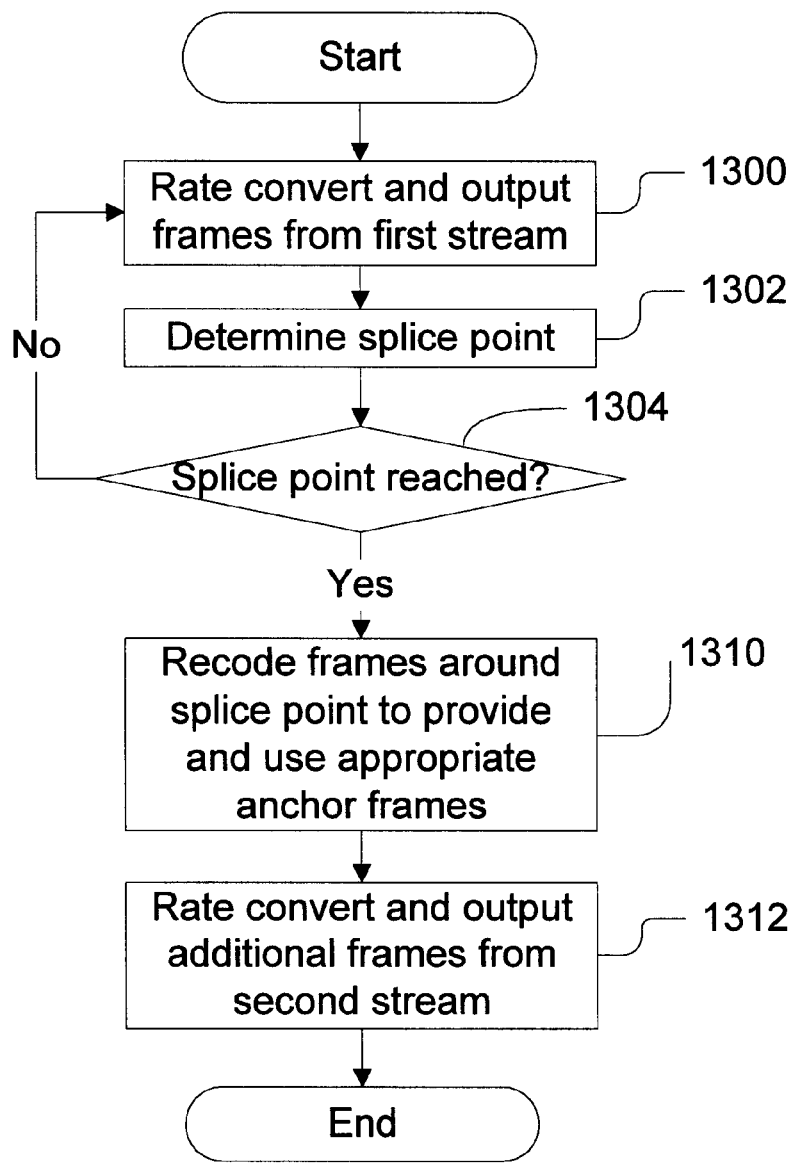
FIG. 13 is a flowchart of a first and preferred embodiment of the method for splicing two bitstreams into a single bitstream according to the present invention.

Referring now to FIG. 13, a flow chart of a first embodiment of the method for splicing two bitstreams into a single bitstream according to the present invention is shown. The process begins in step 1300 by rate converting and outputting frames from the first bitstream. During this step, the present invention performs rate conversion to ensure that there is decoder buffer compliance. This can be done variably if the first stream has a variable bit rate. Next in step 1302, a splice exit point is determined. This is preferably done by giving a presentation time stamp after which to switch from outputting the first bitstream to a second bitstream. Next in step 1304, the method tests whether the exit point has been reached by comparing the PTS of the frame currently being output to the exit point. If the exit point has not been reached, the method returns to step 1300 to continue converting and outputting frames from the first bitstream. On the other hand, if the exit point has been reached, the method proceeds to step 1310. In step 1310, the method continues by recoding frames around the splice point to provide and use the appropriate anchor frames. If necessary, the anchor frames of the second stream are re-encoded to I-frames along with any B-frames that reference frames before the exit point. Next in step 1312, the method rate converts and outputs additional frames of the second bitstream. If rate conversion is necessary then requantization with rate conversion is performed; otherwise just requantization is performed to generate the additional frames of the second stream. During this step, the present invention again performs rate conversion to ensure that there is decoder buffer compliance. After step 1312, the method is complete.

Figure 14:
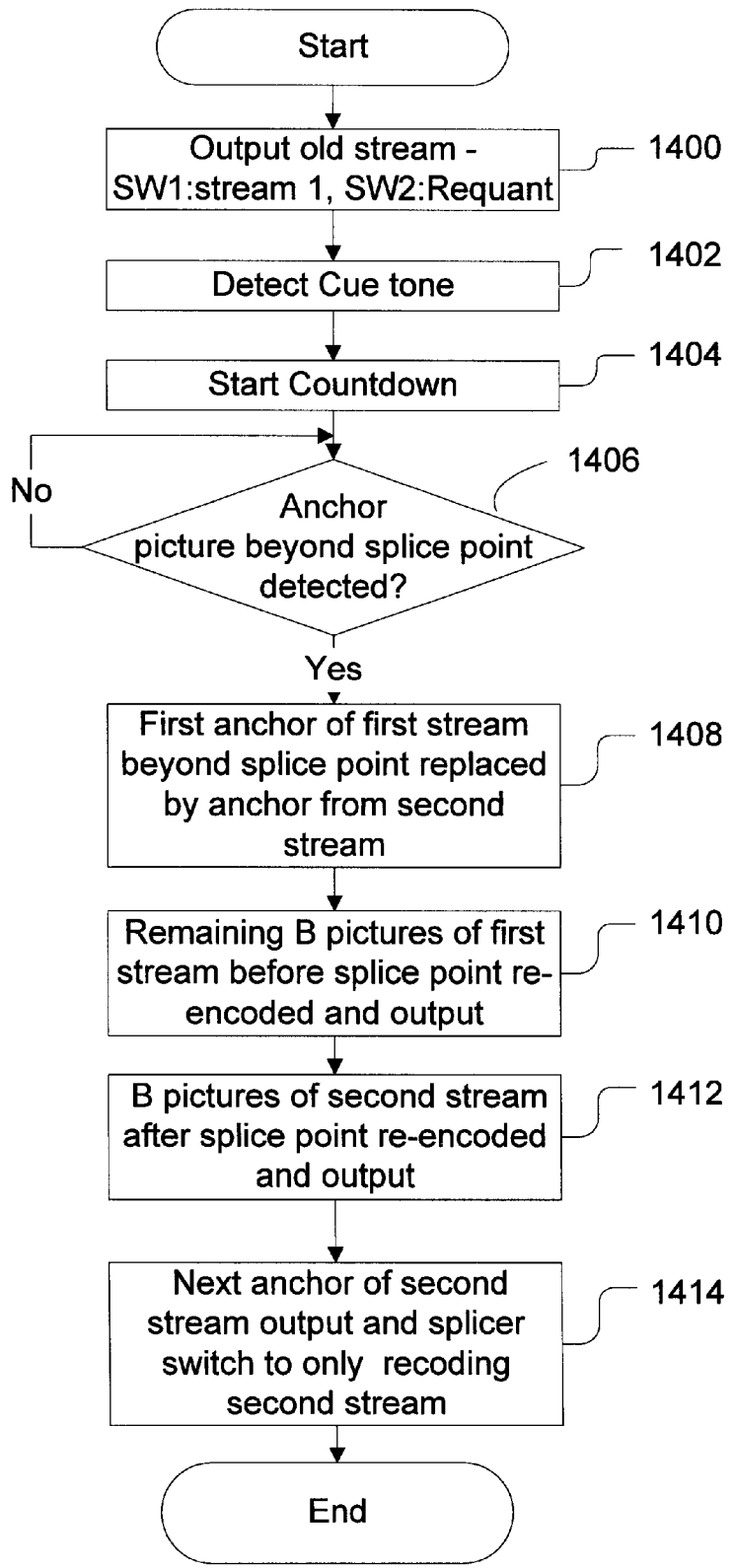
FIG. 14 is a flowchart of a second embodiment of a method for splicing two bitstreams into a single bitstream according to the present invention.

Referring now to FIG. 14, a second embodiment of the method for switching from a first bitstream to a second bitstream according to the present invention is shown. The second embodiment of the method for splicing two bitstreams begins with step 1400 where the first bitstream is output. This is preferably done such as by setting the first switch sw1 to provide the first bitstream and the second switch sw2 to provide the output of the recoding unit 704. Next in step 1402, a cue tone is detected to signal that the splice point coming. Next in step 1404, the method starts a countdown a predetermined time after the cue tone signal is started. The countdown ensures that the reference memories 712, 722 have enough data for re-encoding. Then in step 1406, the method tests whether the first anchor in the first stream beyond the splice point has been detected. Comparing the presentation time stamp of each anchor frame to a presentation time stamp value for the splicing point preferably does this. If the first anchor beyond the splice point has not been detected, the method loops through step 1406 until the splice point has been exceeded. On the other hand, the first anchor beyond the splice point has been detected the method continues in 1408. In step 1408, the method replaces the first anchor of the first stream beyond the splice point with an anchor from the second stream. Then in step 1410, the method re-encodes and outputs the remaining B-pictures before the splice point. Next in step 1412, the method re-encodes and outputs the remaining B-pictures of the second stream after the splice point but before the next anchor of the second stream. Then in step 1414, the method outputs the next anchor of the second stream and switches to only re-coding the second stream after which the method is complete and ends.

While the present invention has been described with reference to certain preferred embodiments, those skilled in the art will recognize that various modifications may be provided. For example, the preferred embodiment of the present invention is directed to ensuring buffer compliance and eliminating rate mismatching, to ensuring anchor frame regeneration, and time base correctness. One alternate embodiment of the present invention could eliminate the recoding unit 704 where the first and second bitstreams are perfectly matched in bit rate. Yet another embodiment of the present invention could eliminate the reference memories, switches and transformers used for anchor frame regeneration if is guaranteed that an anchor frame is placed in the first stream just before the splicing point and the second stream starts with an anchor frame. These and other variations upon and modifications to the preferred embodiments are provided for by the present invention that is limited only by the following claims.

What is claimed is:

1. A system for splicing a first bit stream and a second bit stream to produce and output bit stream, the system comprising:

a first buffer having an input and an output, the input of the first buffer coupled to receive the first bit stream;

a second buffer having an input and an output, the input of the second buffer coupled to receive the second bit stream;

a splicer having a first input, a second input and an output, the first input of the splicer coupled to the output of the first buffer, the second input of the splicer coupled to the output of the second buffer, the splicer switching between outputting the first bit stream and the second bit stream;

a recoding unit that reduces the bit rate of video data output by the splicer according to the available bandwidth of a channel;

a time stamp adjuster coupled to the first and second buffers, the time stamp adjuster operable to generate a continuous time base of the video data output by the splicer, wherein the time stamp adjuster comprises a first phase locked loop coupled to the output of the first buffer, the first phase locked loop operable to generate a first local clock; and an output buffer having an input and an output, the input of the output buffer coupled to the output of the splicer, the output of the output buffer providing an output spliced stream.

2. The system of claim 1, wherein the time stamp adjuster further comprises a second phase lock loop coupled to the output of the second buffer, the second phase locked loop operable to generate a second local clock.

3. The system of claim 2, wherein the system further comprises a time stamp extractor for generating reference clock signals and presentation clock signals from the first and second bitstreams, the time stamp extractor having inputs and outputs, the inputs of the time stamp extractor coupled to the outputs of the first and second buffers, and the outputs of the time stamp extractor coupled to inputs of the time stamp adjuster.

4. The system of claim 2, wherein the system further comprises a time stamp replacer for combining a reference clock signal and presentation clock signal from the time stamp adjuster to data from the splicer, the time stamp replacer having inputs and outputs, the inputs of the time stamp replacer coupled to outputs of the time stamp adjuster, an input of the time stamp replacer coupled to the output of the splicer, and the output of the time stamp replacer providing an MPEG compliant bitstream.

5. The system of claim 2, wherein the time stamp adjuster further comprises:

an offset calculator having a first input, a second input, and an output, the offset calculator generating a signal indicating the difference between the signal at the first input of the offset calculator and the signal at the second input of the offset calculator, the first input of the offset calculator coupled to receive the first local clock and the second input of the offset calculator coupled to receive the second local clock; and a first adder having a first input, a second input and an output, the first input of the adder selectively coupled to the output of the first phase lock loop or the output of the second phase lock loop, the second input of the first adder coupled to the output of the offset calculator.

6. The system of claim 5, wherein the time stamp adjuster further comprises a second adder having a first input, a second input and an output, the first input of the second adder selectively coupled to receive a presentation clock signal for the first bit stream or a presentation clock signal for the second bit stream, the second input of the second adder coupled to the output of the offset calculator, the output of the second adder providing a presentation clock signal for the spliced bit stream.

7. The system of claim 1, wherein the recoding unit for adjusting the bit rate output by the splicer includes a variable length encoder coupled to a rate converter, and the rate converter coupled to a variable length decoder for performing variable length encoding and decoding.

8. The system of claim 1, wherein the recoding unit for adjusting the bit rate output by the splicer includes a variable length encoder coupled to a dequantization unit, the dequantization unit coupled to a rate converter, the rate converter coupled to a quantization unit, and the quantization unit coupled to a variable length decoder for performing variable length coding and quantization.

9. The system of claim 1, wherein the recoding unit for adjusting the bit rate output by the splicer includes a variable length encoder coupled to a dequantization unit, the dequantization unit coupled an inverse transformer, the inverse transformer coupled to a rate converter, the rate converter coupled to a DCT transformer, the DCT transformer coupled to a quantization unit, and the quantization unit coupled to a variable length decoder for performing variable length coding, quantization and DCT tranformation.

10. The system of claim 1, wherein the recoding unit for adjusting the bit rate output by the splicer includes a variable length encoder coupled to a dequantization unit, the dequantization unit coupled an inverse transformer, the inverse transformer coupled to a motion compensator, the motion compensator coupled to a motion estimator, the motion estimator coupled to a DCT transformer, the DCT transformer coupled to a quantization unit, and the quantization unit coupled to a variable length decoder for performing variable length coding, quantization, DCT tranformation and motion estimation.

11. A system for generating an output spliced stream, the system comprising:
  a splicer operable to receive a first stream and a second bit stream, the splicer operable to re-encode portions of the first bit stream before a splice point, the splicer comprising:
    a first decoder for decoding the first bit stream, the first decoder having an input and an output;
    a second decoder for decoding the second bit stream, the second decoder having an input and an output;
    an encoder having an input and an output for encoding a spliced bit stream; and
    a first anchor frame re-generation unit having an input and an output, the input of the first anchor frame re-generation unit selectively connectable to the output of the first decoder, and the output of the first anchor frame re-generation unit selectively connectable to the input of the encoder;
  an output buffer having an input and an output, the input of the output buffer coupled to the output of the splicer, the output of the output buffer providing an output splice stream means for selectively coupling the output of the first decoder, the output of the second decoder, or neither to the input of encoder.

12. The system of claim 11, wherein the splicer re-encodes portions of the second bit stream after the splice point.

13. The system of claim 11, wherein the splicer re-encodes portions of the first bit stream before the splice point and re-encodes portions of the second bit stream after the splice point.

14. The system of claim 12, wherein the means for selectively coupling includes a recoding unit and a plurality of switches.

15. The system of claim 14, wherein the recoding unit performs one from the group of recoding, requantization, re-transformation and re-encoding.

16. The system of claim 12, further comprising a second anchor frame re-generation unit having an input and an output, the input of the second anchor frame re-generation unit selectively connectable to the output of the second decoder, and the output of the second anchor frame re-generation unit selectively connectable to the input of the encoder.

17. The system of claim 12, wherein the first anchor frame re-generation unit comprises:
  a first inverse transformer having an input and an output, for generating a raw video image from a decoded bitstream, the input of the first inverse transformer selectively connectable to the output of the first decoder;
  a reference memory for storing raw video data, the reference memory having an input and an output, the input of the reference memory coupled to the output of the first inverse transformer; and
  a first transformer having an input and an output, for generating a coded bitstream from a raw video image, the input of the first transformer coupled to the output of the reference memory, the output of the first transformer selectively connectable to the input of the encoder.

18. The system of claim 17, wherein the first inverse transformer includes a dequantizing unit, a inverse transformation unit and a motion compensation unit.

19. The system of claim 17, wherein the first transformer includes a quantizing unit, a transformation unit and a motion estimation unit.

20. The system of claim 12, further comprising:
  a plurality of switches; and
  a splicer controller for controlling the plurality of switches, the coupling of the first anchor frame re-generation unit and the means for selectively coupling, the splicer controller having a plurality of inputs and a plurality of outputs, the inputs coupled to the outputs of the first buffer and the second buffer, and the outputs coupled to the switches.

21. A method for frame accurate splicing between a first bit stream and a second bit stream, the method comprising the steps of:
  outputting frames from the first bit stream;
  determining a splice point;
  determining the first anchor picture in the first bit stream having a display time after the splice point;
  reducing the bit rate of video data in one of the first bit stream and the second bit stream according to the available bandwidth of a channel;
  re-encoding pictures of the first bit stream having a display time subsequent to the determined first anchor picture of the first bit stream and before the splice point so that the re-encoded pictures of the first bit stream do not reference a forward reference frame;
  replacing the determined first anchor picture of the first bit stream with an anchor picture from the second bit stream having a display time after the splice point; and
  outputting frames from the second bit stream.

22. The method for frame accurate splicing of claim 21 wherein adjusting the bit rate of video data in one of the first bit stream and the second bit stream occurs during the steps of outputting such that there is decoder buffer compliance.

23. The method for frame accurate splicing of claim 21 further comprising the step of:
  re-encoding pictures of the second bitstream having a display time after the splice point and before the first anchor picture of the second bitstream so that the re-encoded pictures of the second bitstream do not reference a backward reference frame.

24. The method for frame accurate splicing of claim 21 wherein the step of replacing the determined first anchor picture replaces the determined first anchor picture with a re-encoded anchor picture based on a first anchor picture of the second bit stream having a display time after the splice point.

25. The method for frame accurate splicing of claim 24, wherein the re-encoded anchor picture is regenerated as an I picture.

26. The method for frame accurate splicing of claim 24, wherein the re-encoded anchor picture is regenerated as a P picture with all intra macroblock.

27. A system for splicing a first bit stream and a second bit stream to produce and output bit stream, the system comprising:
   a first buffer having an input and an output, the input of the first buffer coupled to receive the first bit stream;
   second buffer having an input and an output, the input of the second buffer coupled to receive the second bit stream;
   a splicer having a first input, a second input and an output, the first input of the splicer coupled to the output of the first buffer, the second input of the splicer coupled to the output of the second buffer, the splicer switching between outputting the first bit stream and the second bit stream;
   a first phase lock loop for generating a first local clock, the first phase lock loop having an input and an output, the input of the first phase lock loop coupled to the output of the first buffer;
   a recoding unit that reduces the bit rate of video data output by the splicer based on the available bandwidth in the channel left open by the first bitstream; and
   an output buffer having an input and an output, the input of the output buffer coupled to the output of the splicer, the output of the output buffer providing an output spliced stream.

28. The system of claim 27 wherein the recoding unit adjusts the bit rate of video data so that the resulting bit rate profile fits the available bandwidth of the channel.

29. A system for splicing a first bit stream and a second bit stream to produce and output bit stream, the system comprising:
   a first buffer for storing video data from the first bit stream received from a network transmission and having a first bit rate;
   a second buffer for storing video data from the second bit stream received from a network transmission and having a second bit rate;
   a splicer that receives video data stored in the first buffer and video data stored in the second buffer and switches between outputting the first bit stream and the second bit stream;
   a first phase lock loop for generating a first local clock, the first phase lock loop having an input and an output, the input of the first phase lock loop coupled to the output of the first buffer;
   a recoding unit configured to rate convert video data from the first bit stream and the second bit stream;
   an output buffer for storing an output spliced stream including video data from the first bit stream and video data from the second bit stream;
   wherein the system splices and rate converts the first bit stream and the second bit stream in real time.

30. The system of claim 29 wherein the first buffer and the second buffer are sized according to the processing speed of the splicer.

31. The system of claim 29 wherein the first bit stream has a greater bit rate than the second bit stream.

32. The system of claim 29 further comprising a first variable length decoder that outputs DCT coefficients and motion vectors from the first bit stream and a second variable length decoder that outputs DCT coefficients and motion vectors from the second bit stream.

33. The system of claim 29 further comprising an anchor frame re-generation unit that includes an inverse transformer, a reference memory and a transformer.

34. The system of claim 33 further comprising a second anchor frame re-generation unit that includes a second inverse transformer, a second reference memory and a second transformer.

35. The system of claim 29 further comprising a time stamp adjuster for generating a continuous time base in the output spliced stream, the time stamp adjuster having inputs and outputs, the time stamp adjuster having its inputs coupled to the outputs of the first and second buffers.

36. The system of claim 29 further comprising a second phase lock loop for generating a second local clock, the second phase lock loop having an input and an output, the input of the second phase lock loop coupled to the output of the second buffer.

37. The system of claim 36 further comprising an offset calculator having a first input, a second input, and an output, the offset calculator generating a signal indicating the difference between the signal at the first input of the offset calculator and the signal at the second input of the offset calculator, the first input of the offset calculator coupled to receive the first local clock and the second input of the offset calculator coupled to receive the second local clock.

38. A method for frame accurate splicing between a first bit stream and a second bit stream, the method comprising the steps of:
   rate converting video data from the first bit stream;
   determining a splice point;
   removing temporal dependence on video data in the first bit stream after the splice point from video data in the first bit stream before the splice point, wherein removing temporal dependence on video data in the first bit stream comprises re-encoding pictures of the first bit stream having a display time subsequent to the determined first anchor picture of the first bit stream and before the splice point so that the re-encoded pictures of the first bit stream do not reference a forward reference frame; and
   removing temporal dependence on video data in the second bit stream before the splice point from video data in the second bit stream after the splice point.

39. The method of claim 38 wherein the system splices the first bit stream and the second bit stream in real time.

40. The method of claim 38 wherein one of the first bit stream and the second bit stream is a variable bit rate bit stream.

41. The method of claim 38 wherein rate conversion of the video data from the first bit stream or rate conversion of the video data from the first bit stream overcomes rate mismatch problems in the downstream decoder buffer.

42. The method of claim 38 wherein the first bit stream is part of a statistically remultiplexed bitstream.

43. The method of claim 42 wherein the second bit stream is rate converted to fit the available bandwidth left open by the first bit stream.

44. The method of claim 43 wherein the first bit stream is rate converted to the level needed for the second bit stream.

45. The method of claim 38 further comprising determining whether the second bit stream has the same bit rate as the available transmission bandwidth.

46. An apparatus for combining a plurality of bit streams, the apparatus comprising:

means for outputting frames from the first bit stream;

means for determining a splice point;

means for determining the first anchor picture in the first bit stream having a display time after the splice point;

means for reducing the bit rate of video data in one of the first bit stream and the second bit stream according to the available bandwidth of a channel;

means for re-encoding pictures of the first bit stream having a display time subsequent to the determined first anchor picture of the first bit stream and before the splice point so that the re-encoded pictures of the first bit stream do not reference a forward reference frame;

means for replacing the determined first anchor picture of the first bit stream with an anchor picture from the second bit stream having a display time after the splice point; and means for outputting frames from the second bit stream.

* * * * *

UNITED STATES PATENT AND TRADEMARK OFFICE
CERTIFICATE OF CORRECTION

PATENT NO.    : 6,611,624 B1
DATED         : August 26, 2003
INVENTOR(S)   : Ji Zhang et al.

It is certified that error appears in the above-identified patent and that said Letters Patent is hereby corrected as shown below:

<u>Title page,</u>
Item [73], change Assignee to -- Cisco Technology, Inc., San Jose, CA (US) --

Signed and Sealed this

Eleventh Day of November, 2003

JAMES E. ROGAN
*Director of the United States Patent and Trademark Office*